US010880191B1

(12) United States Patent
Kant et al.

(10) Patent No.: US 10,880,191 B1
(45) Date of Patent: Dec. 29, 2020

(54) ONLINE COMPUTER SYSTEM WITH METHODOLOGIES FOR DISTRIBUTED TRACE AGGREGATION AND FOR TARGETED DISTRIBUTED TRACING

(71) Applicant: Netflix, Inc., Los Gatos, CA (US)

(72) Inventors: Nitesh Kant, Fremont, CA (US); Danny Yuan, Fremont, CA (US); Sudhir Tonse, Fremont, CA (US)

(73) Assignee: NETFLIX, INC., Los Gatos, CA (US)

( * ) Notice: Subject to any disclaimer, the term of this patent is extended or adjusted under 35 U.S.C. 154(b) by 733 days.

(21) Appl. No.: 14/497,735

(22) Filed: Sep. 26, 2014

(51) Int. Cl.
*H04L 12/26* (2006.01)
*H04L 29/08* (2006.01)
*G06F 16/951* (2019.01)

(52) U.S. Cl.
CPC ............ *H04L 43/08* (2013.01); *G06F 16/951* (2019.01); *H04L 67/02* (2013.01)

(58) Field of Classification Search
CPC ............ G06F 11/3476; G06F 17/3089; G06F 11/3495; G06F 16/951; G06F 16/958; G06F 16/254; G06F 2201/875; G06F 11/36; G06F 11/323; G06F 21/00; H04L 63/1425; H04L 67/22; H04L 43/08; H04L 67/02; H04L 69/22; H04L 43/14; H04L 43/10; H04L 51/00; H04L 51/34
See application file for complete search history.

(56) References Cited

U.S. PATENT DOCUMENTS

| 9,189,355 B1* | 11/2015 | Moturu ................. G06F 11/301 |
| 2008/0155350 A1* | 6/2008 | Ivanov ................. G06F 11/3495 714/45 |
| 2012/0166637 A1* | 6/2012 | White, Jr. ............... H04L 29/00 709/224 |
| 2013/0111011 A1* | 5/2013 | Moulhaud ........... G06F 11/3495 709/224 |
| 2013/0254376 A1* | 9/2013 | Kudikala ................ H04L 43/10 709/224 |

OTHER PUBLICATIONS

Sigelman et al.; Dapper, a Large-Scale Distributed Systems Tracing Infrastructure; Apr. 2010; Google; pp. 1-14.*
Sigelman et al., "Dapper, a Large-Scale Distributed System Tracing Infrastructure" Google Technical Report dapper, dated Apr. 2010, 14 pages.

* cited by examiner

*Primary Examiner* — Muhammad Raza
(74) *Attorney, Agent, or Firm* — Artegis Law Group, LLP

(57) ABSTRACT

An online distributed computer system with methodologies for distributed trace aggregation and targeting distributed tracing. In one aspect, the disclosed distributed tracing technologies improve on existing distributed tracing technologies by providing to application developers and site operations personnel a more holistic and comprehensive insight into the behavior of the online distributed computer system in the form of computed span metric aggregates displayed in a graphical user interface thereby making it easier for such personnel to diagnose problems in the system and to support and maintain the system. In another aspect, the disclosed distributed tracing technologies improve on existing distributed tracing technologies by facilitating targeted tracing of initiator requests.

13 Claims, 10 Drawing Sheets

| trace_id | span_id = 1 | span_id=2 | ... | span_id=n |
|---|---|---|---|---|
| abc656b2a23d42be | <data> | <data> | ... | <data> |
| 337c7ed4b7c0a960 | <data> | ... | ... | |
| ... | ... | ... | ... | ... |
| 57ca0c6135ad4ac8 | <data> | <data> | ... | |

ONLINE COMPUTER SYSTEM WITH METHODOLOGIES FOR DISTRIBUTED TRACE AGGREGATION AND FOR TARGETED DISTRIBUTED TRACING

TECHNICAL FIELD

The present invention relates generally to online distributed computer systems and, more particularly, to tracing user requests processed by such systems.

BACKGROUND

The first web sites were largely implemented with only two "tiers" of computers. Requests from users' web browsers were mainly handled by a first tier of web server computers. In some instances, a web server computer in the first tier would need to request data from a database server in the second tier of computers in order to formulate and send an appropriate response to a user's request. Over time, a third tier, commonly known as the "application tier", was added in between the web server tier and the database tier. In both cases, tracing user requests through the various server tiers was relatively simple because the overall distributed computer environment was limited and clearly defined.

With the ever-increasing popularity of the Internet, more and more online services are implemented as complex, large-scale distributed computer systems. Modern online services can have hundreds of applications executing on thousands of computing devices in multiple data center facilities. Management and execution of all of the various applications is typically facilitated by server "virtualization". Virtualization allows multiple "virtual" servers (i.e., instances) to execute the applications at one or more levels above the host computing devices. In the last several years, virtualization has become pervasive and is used by online service providers to more easily and rapidly provision new computing resources to meet user demand.

As more and more online services become facilitated by virtualization, a whole new set of challenges face providers of online services: these previously small-scale, well-understood computer environments are now N-tier distributed computer systems executing hundreds of applications across thousands of instances in multiple data centers with new applications and application upgrades constantly being added. A particular set of challenges involve understanding system behavior and being able to reason about performance issues and system failures.

Some online service providers have, in response, introduced technologies to provide application developers with more information about the behavior of these complex distributed systems in which there are large collections of server computing devices, including "tracing", logging, and similar technologies—all designed to capture information about the runtime behavior of a computer system. "Tracing" is a technology for capturing and recording information about a software system's execution.

One tracing technology proposed for distributed computer systems is known as "Dapper" and is described in the paper "Dapper, a large-scale distributed systems tracing infrastructure", Benjamin H. Sigelman, Luiz Andre Barroso, Mike Burrows, Pat Stephenson, Manoj Plakal, Donald Beaver, Saul Jaspan, Chandan Shanbhag, Google Technical Report dapper-2010-1, April 2010, the entire contents of which is hereby incorporated by reference as if fully set forth herein. For example, Dapper technology can be used to trace randomly selected user requests. However, despite the effectiveness of tracing randomly selected user requests, issues remain in providing developers with information about the behavior of online distributed computer systems.

One particular problem that remains is how to provide a more holistic and comprehensive picture of the distributed system behavior. For example, a trace of a user request may be able to inform about which applications of the online service were invoked to handle the user request. However, a single trace may provide little to no insight into where the performance hotspots in the system are over a period of time.

Another particular problem that remains is how to selectively trace certain user requests. For example, a user may report an error when making a certain request of an online service. In this case, the online service provider may wish to trace a selected subset of all subsequent user requests of the online service in order to diagnose the root cause of the error. For example, the online service provider may wish to trace all subsequent user requests from the user that reported the error. Such targeted tracing is not possible with a distributed tracing technology that traces only randomly selected user requests.

Accordingly, there is a need for distributed system tracing technologies that provide a more holistic and comprehensive picture of online distributed system behavior and for distributed tracing technologies that allow targeted tracing of user requests. Such technologies increase the effectiveness and efficiency of application developer and system administrator activities like maintaining and troubleshooting applications in an online distributed computer system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The above deficiencies and other problems associated with distributed tracing technologies for online distributed computer systems are reduced or eliminated by the disclosed distributed tracing technologies.

A first aspect of the distributed tracing technologies of the present invention includes, for example, a method for distributed trace aggregation in an online distributed computer system. The method comprises the steps of generating trace events at a plurality of system nodes of the online distributed computer system for a plurality of request paths. Each trace event is generated for a corresponding one of the request paths and for a corresponding span of the corresponding request path. The corresponding span represents computation performed by the system node at which the trace event is generated on behalf of an interprocess communication call from a parent span in the corresponding request path. The parent span corresponds to one of the system nodes in the corresponding request path. The method further includes the steps of collecting the generated trace events from the system nodes; identifying a subset of the collected trace events pertaining to a particular system node; computing a span metric aggregate from span metrics in the subset of trace events; displaying, in a graphical user interface, a graphical representation of the particular system node; and displaying, in the graphical user interface, the span metric aggregate in conjunction with the display of the graphical representation of the particular system node.

The first aspect of the disclosed distributed tracing technologies improves existing distributed tracing technologies by providing to application developers and site operations personnel a more holistic and comprehensive insight into the behavior of the online distributed computer system in the form of computed span metric aggregates displayed in a graphical user interface thereby making it easier for such personnel to diagnose problems in the system and to support and maintain the system.

A second aspect of the distributed tracing technologies of the present invention includes, for example, a method for targeted distributed tracing in an online distributed computer system. The method comprises the steps of receiving a targeted trace query at an edge node of the online distributed computer system; receiving an initiator request at the edge node; evaluating the query against the initiator request; and enabling distributed tracing of the initiator request if the initiator request satisfies the query.

The second aspect of the disclosed distributed tracing technologies improves existing distributed tracing technologies by facilitating precise targeted tracing of initiator requests.

These and other aspects of the disclosed technologies of the present invention are described in greater detail below with reference to the drawings.

BRIEF DESCRIPTION OF THE DRAWINGS

FIG. 7 illustrates an example relation for storing collected trace events.

DETAILED DESCRIPTION

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

1.0 Basic Computing Enviroment

The below-described basic computer environment is presented for purposes of illustrating the basic underlying computer components that may be employed for implementing the disclosed technologies. For purposes of discussion, the following description will present certain examples in which it will be assumed that "server" computing devices receive requests from remote "client" computing devices. The present invention, however, is not limited to any particular computer environment or computer system configuration. In particular, a client/server distinction is not necessary to the invention, but is used to provide a framework for discussion. Instead, the disclosed technologies may be implemented in any type of computer system architecture or computer environment capable of supporting the disclosed technologies presented in detail here, including peer-to-peer configurations, or the like.

1.1 Implementing Mechanism (Hardware Overview)

The disclosed technologies may be implemented on one or more computing devices. Such a computing device may be implemented in various forms including, but not limited to, a client, a server, a network device, a mobile device, a laptop computer, a desktop computer, a workstation computer, a personal digital assistant, a blade server, a mainframe computer, and other types of computers. The computing device described below and its components, including their connections, relationships, and functions, is meant to be exemplary only, and not meant to limit implementations of the disclosed technologies described in this specification. Other computing devices suitable for implementing the disclosed technologies of the present invention may have different components, including components with different connections, relationships, and functions.

Figure 1:
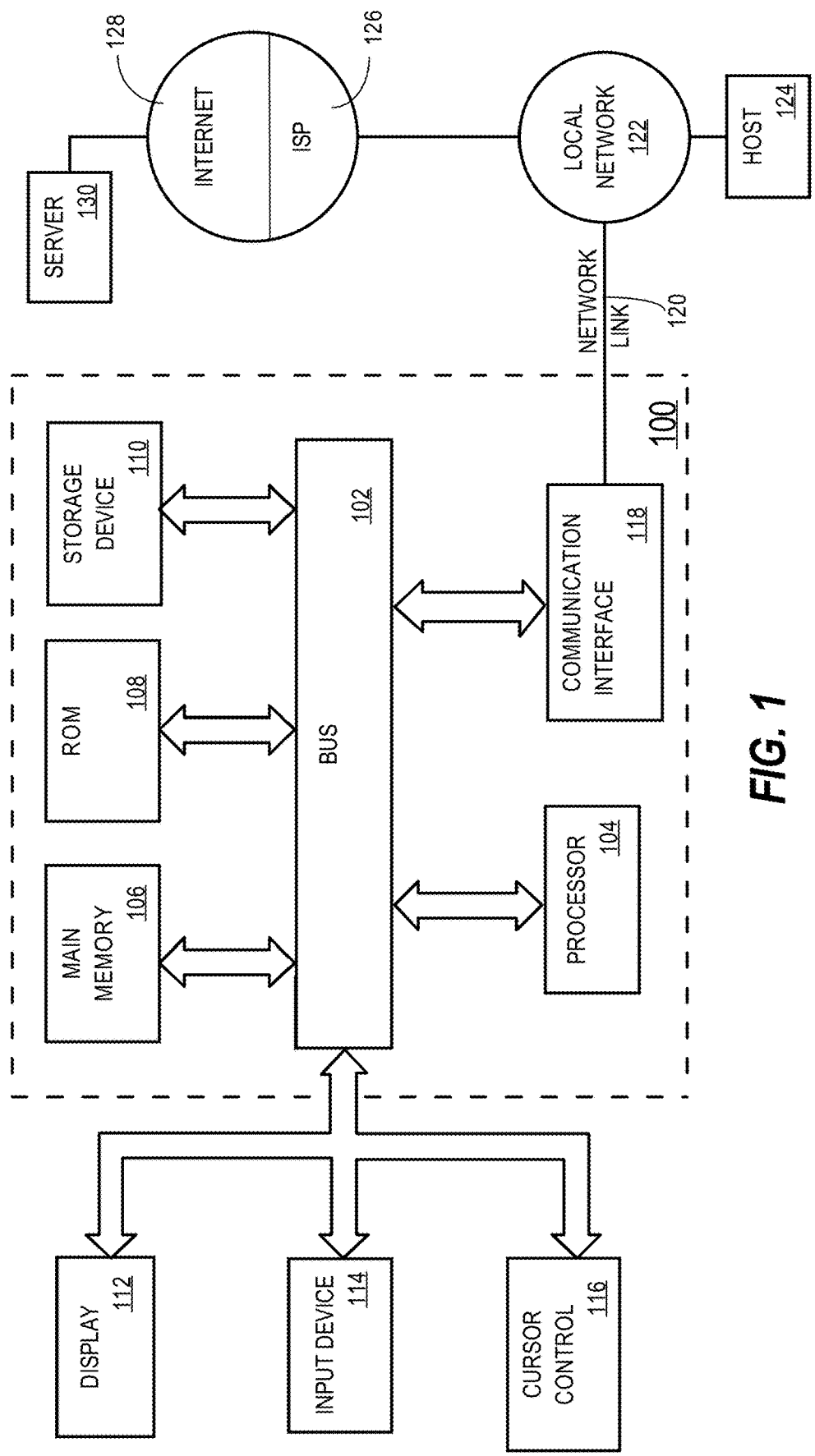
FIG. 1 is a very general block diagram of an example computing device in which the disclosed technologies may be embodied.

FIG. 1 is a block diagram that illustrates an example of a computing device 100 suitable for implementing the disclosed technologies. Computing device 100 includes a bus 102 or other communication mechanism for communicating information, and a hardware processor 104 coupled with bus 102 for processing information. Hardware processor 104 may be, for example, a general purpose microprocessor or a system on a chip (SoC).

Computing device 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computing device 100 into a special-purpose computing device that is customized to perform the operations specified in the instructions.

Computing device 100 further includes a read only memory (ROM) 108 or other static storage device coupled to bus 102 for storing static information and instructions for processor 104.

A storage device 110, such as a magnetic disk, optical disk, or solid-state drive is provided and coupled to bus 102 for storing information and instructions.

Computing device 100 may be coupled via bus 102 to a display 112, such as a liquid crystal display (LCD) or other electronic visual display, for displaying information to a computer user. Display 112 may also be a touch-sensitive display for communicating touch gesture (e.g., finger or stylus) input to processor 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computing device 100 may implement the methods described herein using customized hard-wired logic, one or more application-specific integrated circuits (ASICs), one or more field-programmable gate arrays (FPGAs), firmware, or program logic which, in combination with the computing device, causes or programs computing device 100 to be a special-purpose machine.

Methods disclosed herein may also be performed by computing device 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid-state drive of a remote computer. The remote computer can load the instructions into its dynamic memory and send the instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computing device 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computing device 100, are example forms of transmission media.

Computing device 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

1.2 Online Disitributed Computer System

Figure 2:
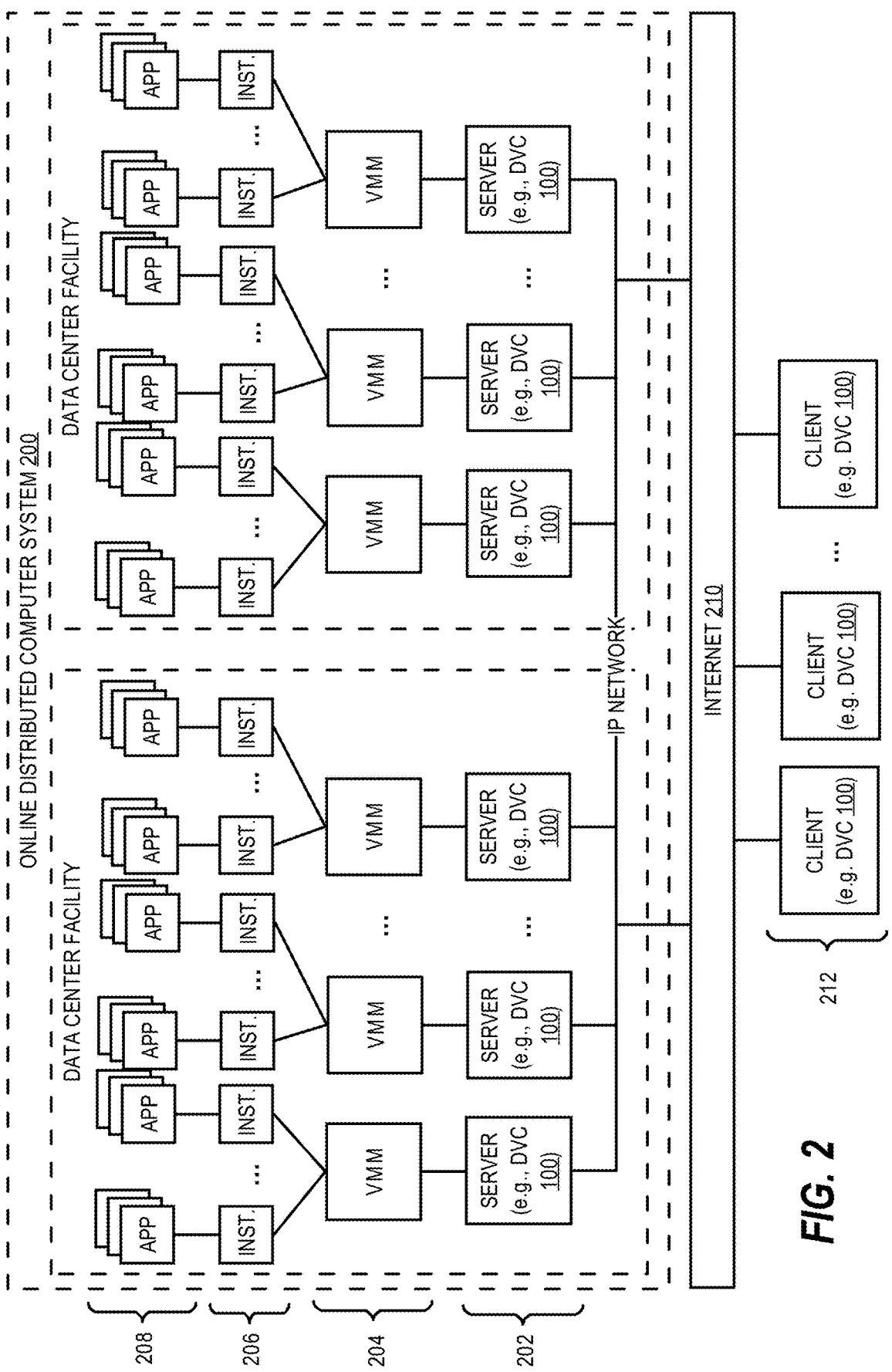
FIG. 2 is a block diagram of an example online distributed computer system in which the disclosed technologies may be implemented.

While the disclosed technologies may operate within a single standalone computing device (e.g., device 100 of FIG. 1), the disclosed technologies may be implemented in an online distributed computer system. FIG. 2 is a block diagram of an example online distributed computer system 200 in which the disclosed technologies may be implemented.

As shown, system 200 is provided for hosting an Internet service. System 200, which may be distributed across one or more data center or hosting facilities, includes server computers 202. Server computers 202 constitute the hardware layer of system 200. Servers 202 provide the computer hardware (e.g., processors 104, memory 106, storage devices 110, and communication interfaces 118) for executing software and for communicating with other computers over data networks.

Typically, servers 202 within a data center and across data centers will be communicatively coupled to one another by Internet Protocol (IP) data networks. IP is the principal network communications protocol in the Internet protocol suite for relaying data packets within and across network boundaries.

Some of the servers 202 are also communicatively coupled to client devices 212 by the Internet 210, which is also an IP data network. These servers, sometimes referred to as "edge servers" because of their network proximity to the Internet 210 relative to other servers of the system, can receive network requests from and return network responses to the client devices 212. Typically, the network requests from the client devices 212 are made according to application level protocol of the Internet protocol suite such as, for example, the Hyper-Text Transfer Protocol (HTTP), or a cryptographically secure variant thereof (e.g., HTTPS). Often, the client devices 212 are end-user devices of users of the Internet service. For example, client devices 212 may include laptop computers, desktop computers, cell phone computers, smart phone computers, tablet computers, set-top computers, gaming computers, and so forth.

A "virtualization" layer is provided on top of the hardware layer by virtual machine monitors (hypervisors) 204 that execute on the servers (host machines) 202. Virtual machine monitors 204 instantiate and run virtual machine instances (guest machines) 206. Each instance 206 comprises a "guest" operating system and one or more applications 208 designed to execute on the guest operating system. A virtual machine monitor 204 presents the guest operating systems of the instances 206 with a virtual operating platform and manages the execution of the guest operating systems.

In some instances, a virtual machine monitor 204 may allow a guest operating system to run as through it is running on the hardware and CPUs of a server 202 directly. In these instances, the same version of the guest operating system configured to execute on a server 202 directly may also be able to execute on a virtual machine monitor 204 without modification or reconfiguration. In other words, a virtual machine monitor 204 may provide full hardware and CPU virtualization to a guest operating system in some instances.

In other instances, a guest operating system may be specially designed or configured to execute on a virtual machine monitor 204 for efficiency. In these instances, the guest operating system is "aware" that it executes on a virtual machine monitor. In other words, a virtual machine monitor 204 may provide para-virtualization to a guest operating system in some instances.

A guest operating system is typically provided for controlling the operation of the virtual machine instance 206 it is executing on. The guest operating system, which is usually stored in main memory 106 and on fixed storage (e.g., hard disk) 110, manages low-level aspects of instance 206 operation, including managing execution of processes, memory allocation, file and network input and output (I/O), and device I/O. The guest operating system can be provided by a conventional operating system such as, for example, MICROSOFT WINDOWS, SUN SOLARIS, LINUX, UNIX, IOS, ANDROID, and so forth.

One or more applications 208, such as server software, daemons, "programs", or set of processor-executable instructions, may also be provided for execution on instances 206. The application(s) may be "loaded" into main memory 106 from storage 110 or may be downloaded from a network location (e.g., an Internet web server). A graphical user interface (GUI) is typically provided for receiving user commands and data in a graphical (e.g., "point-and-click" or "touch gesture") fashion. In addition or alternatively, a command line interface may be provided. These inputs, in turn, may be acted upon by the instance 206 in accordance with instructions from guest operating system and/or application(s) 208. The graphical user interface also serves to display the results of operation from the guest operating system and application(s) 208. Applications 208 may implement various functionality of the Internet service including, but not limited to, web server functionality, application server functionality, database server functionality, analytic functionality, indexing functionality, data warehousing functionality, reporting functionality, messaging functionality, and so forth.

2.0 Distributed Tracing Technology System Components

The disclosed technologies provide distributed trace aggregation and targeted distributed tracing in an online distributed computer system. The distributed trace aggregation and targeted distributed tracing technologies can be used individually or together. Thus, there is no requirement of the disclosed technologies that if one of the technologies is used the other must be used also.

Nonetheless, the distributed trace aggregation and targeted distributed tracing technologies are built on a number of underlying distributed tracing technologies. Accordingly, the underlying distributed tracing technologies will be described first, followed by descriptions of the technologies particular to distributed trace aggregation and targeted distributed tracing.

2.1 Request Paths

An edge server in an online distributed computer system that receives a request from a client device may distribute the request to multiple other servers in the system. Each of those servers may in turn distribute the requests they receive from the edge server to still other servers, and so on. In other words, the single request from the client device to edge server may cause a "fan-out" of multiple levels of multiple requests within the system.

For example, a front-end web server of an Internet streaming video service may distribute a request from a user's client device for available videos to a number of other sub-servers that generate personalized video recommendations, determine the user's geographic location, retrieve video box-art graphics and images, and so forth. Results from all of the sub-servers may then be selectively combined in a web page or other response returned to the client device. In total, many servers and applications may be needed to process a single user request.

More formally, a single network request from an "initiator" can cause a number of "interprocess communication calls" between "nodes" of the online distributed computer system. In other words, the request can have a path through the system starting at the edge node that initially receives the request and traversing one or more other nodes of the system via the interprocess communication calls.

A used herein, the term "node", in the context of an online distributed computer system, refers to any of an executing instance of an application (e.g., 208), a group or cluster of multiple application instances, a virtual machine instance (e.g., 206), a group or cluster of multiple virtual machine instances, a server (e.g., 202), a group or cluster of servers, or some combination of the foregoing. Nodes may be separately identifiable by unique identifiers (e.g., names) which the application(s) of the system may be configured with. For example, the application(s) may be pre-configured with node identifiers or may be so configured at runtime. Thus, each executing application instance may be aware of the unique identifier or name of the node it belongs to, or that it is, if the application instance is a node. In this description, an identifier or a name of a node is referred to herein as a "node identifier", "node name", or "node id".

The "initiator" is typically a client computing device of a user of the Internet service that sends the request to the Internet service in response to some interaction by the user with the client device (e.g., clicking a link on a web page). However, the initiator can be a server computing device or an unattended computing device that sends requests to the service autonomously.

An "interprocess communication call", or just "IPC call" for short, is typically made from one node to another node. The IPC call is typically made over an IP data network and according to application-level IP networking protocol such as, for example, HTTP. An IPC call is typically associated with a calling node that formulates and sends the IPC call to a callee node. Upon receiving the IPC call, the callee node processes the IPC call and formulates and sends an IPC reply back to the calling node. Each of the IPC call and the IPC reply may comprise one or more IP data packets. Typically, the IPC call requests information from the callee node and the IPC reply provides the requested information to the calling node. However, an IPC call can also be used to provide information to the callee node. Accordingly, an IPC reply may simply be an acknowledgement that the information was received.

Figure 3:
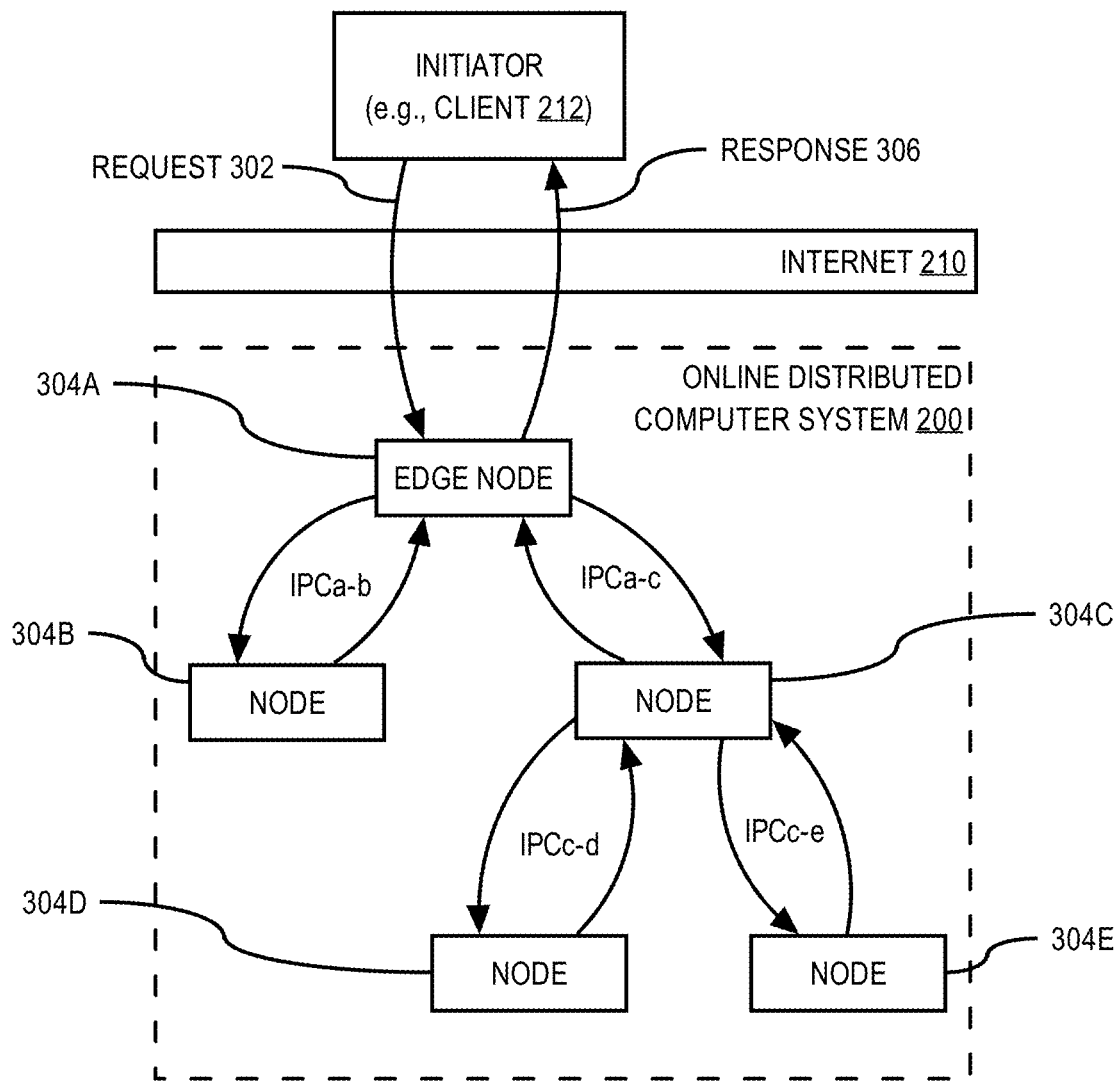
FIG. 3 illustrates an example of the fan-out of a request path through nodes of an online distributed computer system on behalf of a request from an initiator.

For example, FIG. 3 illustrates a simple example of the fan-out of a request path through nodes of an online distributed computer system 200 on behalf of a request 302 from an initiator. As shown, the request 302 is sent from the initiator over the Internet 210 and received at an edge node 304A of the online distributed computer system 200. This causes edge node 304A to make two interprocess communication calls, one to node 304B and the other to node 304C. The IPC call from edge node 304A to node 304C causes node 304C in turn to make two more interprocess communication calls, one to node 304D and the other to node 304E. After the edge node 304A has received the IPC call replies from nodes 304B and 304C, the edge node 304A prepares a response 306 based on the replies and sends it to the initiator. Note that edge node 304A may not receive an IPC call reply from node 304C until after nodes 304D and 304E have replied to node 304C.

One simple way to measure the performance of the system 200 from the end-user perspective is to measure the amount of time between when the request 302 is fully received at the edge node 304A and the response 306 is fully sent from the edge node 304A. If this time is too long, it may indicate that there is problem in the system 200. While this simple measurement may indicate problematic system performance issues, it does not by itself tell which node(s) 304 are causing the poor performance, or even which nodes are in the request path. Thus, engineers and developers would appreciate technologies that provide them with the tools to more effectively diagnose and identify the root cause of poor system performance.

2.2 Distributed Tracing Instrumentation Points

One way to capture information about the request path through the system for a given initiator request is to generate a trace event whenever an application instance a) sends an IPC call, b) receives an IPC call, c) sends an IPC reply, or d) receives an IPC reply. The request path can then be reconstructed from the trace events generated by the application instances caused by processing the initiator's request.

To do this reconstruction, unique "trace identifiers" are used. In particular, the trace identifiers can be assigned to initiator requests at the edge nodes that receive the initiator requests. Then, the trace events caused by application instances processing an initiator request can be generated to include the trace identifier assigned to the initiator request. The trace identifiers in the trace events can then be used to associate the trace events with the particular initiator requests that caused them to be generated. Trace identifiers and other distributed tracing metadata may be propagated between application instances in IPC calls.

These distributed tracing functions may be facilitated through instrumentation at select points of a standard or core software libraries used by the applications that provide basic IPC, threading, and initiator request/response handling functionality to higher-level functionality of the applications. In this context, instrumentation refers to specific software programming language instructions designed to facilitate distributed trace logging such as, for example, by composing and generating a trace event. By instrumenting these basic libraries, the distributed tracing can be transparent to the higher-level functionality. In particular, developers of the higher-level functionality may not need to concern themselves with enabling distributed tracing in the higher-level functionality or otherwise concern themselves with how distributed tracing is accomplished. Simply by using the standard software library as a building block for the higher-level functionality in an application, distributed tracing is enabled.

Figure 4:
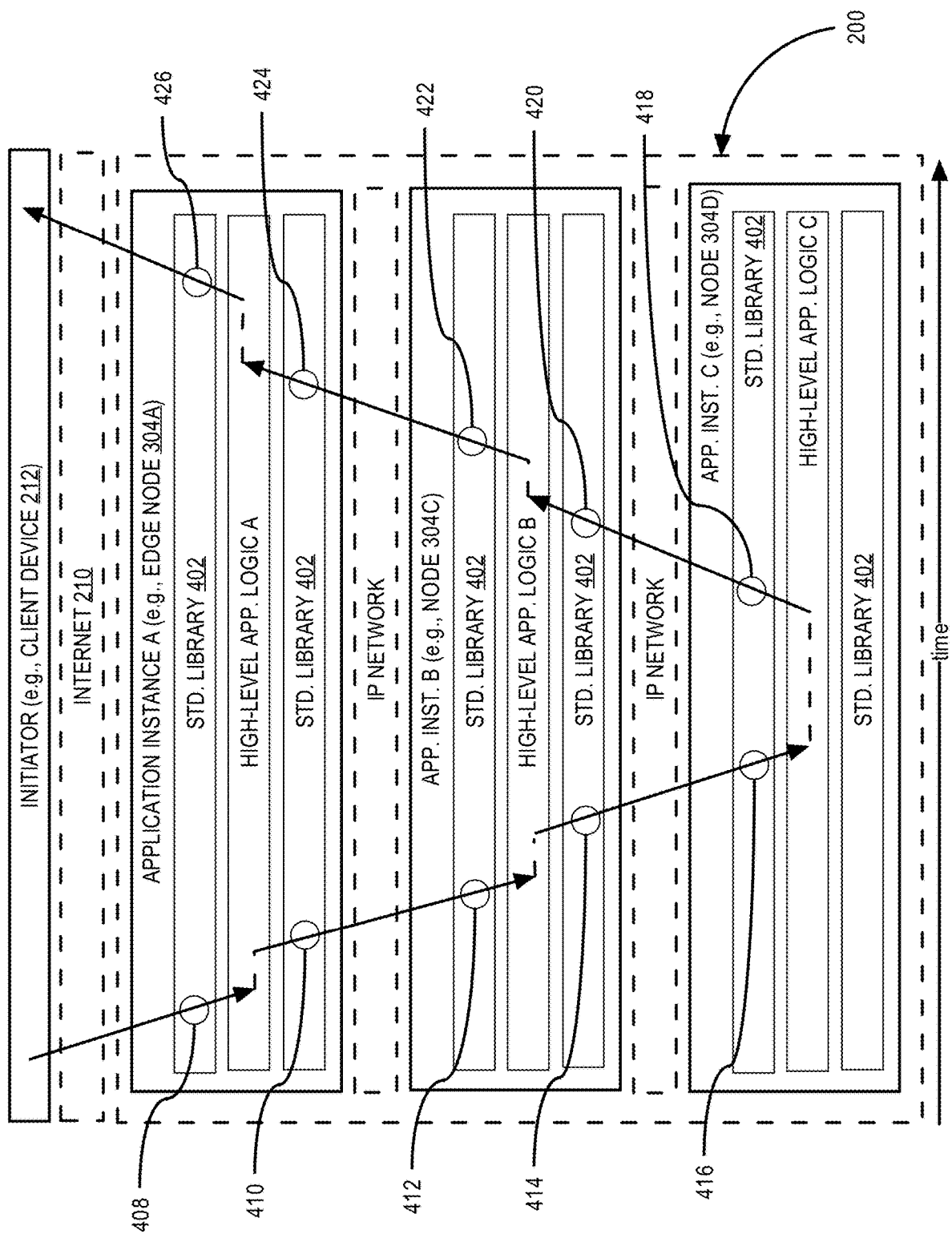
FIG. 4 is a block diagram of an example of how distributed tracing in an online distributed computer system may be facilitated through standard library instrumentation.

FIG. 4 is a block diagram showing an example of how distributed tracing may be facilitated through instrumentation of a standard software library used by applications in an online distributed computer system. In this example, system 200 comprises executing application instance A, executing application instance B, and executing application instance C. Some or all of the applications executing in the system may be built upon a standard software library that provide lower-level functionality to the higher-level functionality (business logic) of the applications. For example, executing application instance A comprising high-level application logic A uses standard software library 402, executing application instance B comprising high-level application logic B also uses standard software library 402, and executing application instance C comprising high-level application logic C also uses standard software library 402.

Typically, the standard software library acts as a software "cushion" for the applications between the high-level application logic and the guest operating system that allows the developers of the high-level application logic to reason about and develop the high-level application functionality without having to be overly concerned about the particulars of the underlying guest operating system(s) the applications execute on. For example, standard library 402 may provide IPC, thread management, and initiator request/response handling services to the high-level application logic A.

The standard library used by the application can be instrumented at select execution points to facilitate distributed tracing. In particular, the standard library can be instrumented to generate at least one trace event and possibly perform other distributed tracing functions at some or all of the following execution points:

1. At any edge node of the online distributed system, when a network request is received from an initiator;
2. At any edge node, when a response to a network request is sent to an initiator;
3. At any calling node, when a IPC call is sent from the calling node to a callee node;
4. At any callee node, when an IPC call is received from a calling node;
5. At any callee node, when an IPC reply is sent from the callee node to the calling node; and
6. At any calling node, when an IPC reply is received at the calling node from a callee node.

For example, in the request path of FIG. 4, standard library 402 can be configured to generate a trace event at each of execution points 408, 410, 412, 414, 416, 418, 420, 422, 424, and 426. An example trace event schema to which generated trace events may conform is presented in the next section.

In the current example, execution point 408 corresponds to item 1 above: when a network request is received at an edge node from an initiator. Execution point 426 corresponds to item 2 above: when a response to a network request is sent from an edge node to an initiator. Execution points 410 and 414 correspond to item 3 above: when an IPC call is sent from a calling node to a callee node. Execution points 412 and 416 represent item 4 above: when an IPC call is received from a calling node. Execution points 418 and 422 correspond to item 5 above: when an IPC reply is sent from a callee node to a calling node. And execution points 420 and 424 correspond to item 6 above: when an IPC reply is received at a calling node from a callee node. The distributed tracing actions performed at these various execution points will now be discussed in greater detail.

1. At any edge node of the online distributed system, when a network request is received from an initiator.

When a network request from an initiator is received at an edge node, the standard library of the edge node may be configured to generate and assign an identifier to the initiator's request. This assigned identifier is referred to herein as a "trace identifier".

A trace identifier assigned to an initiator's request uniquely identifies the request and the consequent request path through the nodes of the online distributed system. For example, in addition to generating a trace event at execution point 408, standard library 402 can also be configured to generate and assign at execution point 408 a trace identifier to the incoming network request from the initiator. In the context of trace identifiers, unique means probabilistically unique among all trace identifiers assigned to initiator requests within a given period of time. For example, the trace identifier may be a 64-bit pseudo-randomly generated number. Although a true random number generator may be used instead.

Other distributed tracing metadata in addition to the trace identifier may be generated by the standard libraries of the nodes. In particular, two additional pieces of distributed tracing metadata may be generated.

A first piece is referred to herein as a "span identifier". In the context of a request path as identified by it assigned trace identifier, a span identifier is an identifier of a "span" in the request path. A span identifier uniquely identifies a span at least among all spans in a request path identified by a trace identifier. Thus, the combination of a trace identifier and a span identifier uniquely identifies a span. As used herein, the term "span" refers to the computational work in terms of amount of data and/or processing time performed by a node processing a single request from an initiator, if the node is an edge node, or processing a single IPC call from a calling node, if the node is a callee node.

A second piece of distributed tracing metadata is referred to herein as a "parent span identifier". Relative to a callee node in a request path as identified by its assigned trace identifier, a parent span identifier is the span identifier of the calling node in the request path.

Assigned span identifiers may be propagated between nodes in a request path in IPC calls between the nodes. For example, referring again to FIG. 4, at execution point 408, standard library 402 of application instance A may assign a span identifier in addition to generating and assigning a trace identifier to the initiator request.

A trace event may also be generated at execution point 408 with the trace identifier of the current request path, no parent span identifier (which indicates that the node is an edge node), and a span identifier of the edge node. Alternatively, the trace event may include a parent trace identifier of zero (0) or NULL or some other predefined value to indicate that the node is an edge node and does not have a parent span.

The trace identifier and the span identifier form part of the "trace context". When an application instance handles a traced execution path (i.e., a traced thread of execution), the trace context can be propagated within the application instance in thread-local storage. For example, at execution point 408, standard library 402 of application instance A may store a trace context in thread-local storage comprising the assigned trace identifier and the assigned span identifier. By doing so, the current trace context can be retrieved from thread-local storage at other execution points along the traced execution path. For example, a trace context added to thread local storage at execution point 408 can be retrieved from thread local storage at execution points 410, 424, and 426.

In the situation where the traced execution path is asynchronous or deferred involving a callback between different threads of execution within the application instance, a callback handler module in the standard library for facilitating the callback can retrieve the trace context from the thread-local storage of the calling thread and store the trace context in the thread-local storage of the called thread when the callback is invoked.

2. At any edge node, when a response to a network request is sent to an initiator.

When a response to an initiator's request is sent from an edge node, the standard library of the edge node can generate a trace event pertaining to this event. For example, standard library 402 of application instance A can generate a trace event at execution point 426. The generated trace event can include the trace identifier of the current request path, no parent span identifier (or a parent span identifier of zero or NULL or some other predefined value to indicate there is no parent span), and the span identifier of the edge node.

3. At any calling node, when a IPC call is sent from the calling node to a callee node.

When a calling node sends an IPC call to a callee node, in addition to generating a trace event, the calling node may provide in the IPC call to the callee node the trace identifier of the current request path and the span identifier of the calling node. For example, at execution point 410, the standard library 402 of application instance A may include the trace identifier and the span identifier generated at execution point 408 in the outgoing IPC call to application instance B. An analogous operation may be performed by the standard library 404 of application instance B at execution point 414 in the IPC call to application instance C. The generated trace event may include the trace identifier of the current request path, a parent span identifier, if appropriate (i.e., the span identifier of the node that called the calling node, if any), and the span identifier of the calling node.

4. At any callee node, when an IPC call is received from a calling node.

When a callee node receives an IPC call from a calling node, in addition to generating a trace event, the callee node may generate a span identifier for itself. The span identifier received in the IPC call is the span identifier of the calling node. In other words, the span identifier received in the IPC call is the parent span identifier for the callee node.

For example, at execution point 410, the standard library 402 of application instance A may send an IPC call that include the trace identifier and the span identifier that were assigned to the request path and the edge node, respectively, at execution point 408. When the IPC call is received at application instance B at execution point 412, the standard library 402 of application instance B can obtain the trace identifier and the span identifier of the calling node from the IPC call. Also at execution point 412, a trace context may be generated comprising a) the trace identifier obtained from the IPC call, b) the parent span identifier obtained from the IPC call, and c) the span identifier generated for the callee node. The generated span identifier can be generated at the callee node and should be unique at least within the current trace. For example, the callee node may generate a span identifier for itself by incrementing the span identifier received in the IPC call from the calling node by a fixed amount (e.g., one (1)). Once generated, the callee node can add the trace context to thread-local storage for propagation to other execution points 414, 420, and 422 within application instance B.

Also at execution point 412, standard library 402 of application instance B may generate a trace event comprising the trace identifier of the current request path, the parent span identifier of the calling node, and the span identifier of the callee node.

Operations analogous to those described above performed at execution point 412 may also be performed at execution point 416 of standard library 402 when application instance C receives the IPC call from application instance B. At execution point 416, the parent span identifier is the span identifier generated at execution point 412 by standard library 402 of application instance B and propagated in the IPC call to application instance C at execution point 414.

5. At any callee node, when an IPC reply is sent from the callee node to the calling node.

When a callee node sends an IPC reply to a calling node, the standard library of the callee node can generate a trace event pertaining to this event. For example, standard library 402 of application instance C can generate a trace event at instrumentation point 418. The generated trace event can include the trace identifier of the current request path, b) the parent span identifier of the calling node, and c) the span identifier of the callee node. Analogously, a trace event may also be generated at execution point 422 when application instance B sends an IPC reply to application instance A.

6. At any calling node, when an IPC reply is received at the calling node from a callee node.

When a calling node receives an IPC reply from a callee node, the standard library of the calling node can generate a trace event pertaining to this event. For example, standard library 402 of application instance B can generate a trace event at execution point 420. The generated trace event can include the trace identifier of the current request path, the parent span identifier, if appropriate, and the span identifier of the calling node. Analogously, a trace event may also be generated at instrumentation point 424 when application instance A receives an IPC reply from application instance B. In this case, there may be no parent span identifier in the generated trace event (or the parent span identifier may be zero or NULL or some other value to indicate that the calling node does not have a parent).

2.3 Trace Event Schema

Trace events (messages) generated by the standard libraries of application instances may conform to a trace event schema. Generally, the schema of a trace event is a set of name-value pairs or properties. Some of the properties are required. Others properties are optional.

Table 1 below provides an example trace event schema with a non-exclusive list of possible properties. Other properties other than those listed may be included in a trace event that conforms to the example schema. The first (leftmost) column lists the names of properties. The second column provides a short description of the values of the properties. The third column indicates which properties are required and which are optional. The fourth (rightmost) column lists which types of trace events the properties may be included in.

TABLE 1

Example Trace Event Schema

| Property Name | Short Description | Optional? | Trace Event Type |
|---|---|---|---|
| trace_id | Globally unique identifier of an initiator request for which the trace event is generated. The trace_id also uniquely identifies the request path through the online distributed computer system resulting from the initiator request. | No | All |
| parent_span_id | An identifier of the calling node, if any, that called the node that generated the trace event. If the node that generates the trace event is an edge node, the parent_span_id property may be absent. Alternatively, the value of the parent_span_id property may zero or NULL or some other predefined value to indicate that the node that generates the trace event is an edge node. | Yes | All |
| span_id | An identifier of the span that generated the trace event. | No | All |
| node_id | Name or identifier of the node that generated the trace event. This may be, for example, an assigned service name, an application name, a cluster name, server name, an auto scaling group name, etc. | Yes | All |
| trace_msg_type | The type of the trace event indicating the event for which the trace event is generated. Can be one of a number of predefined types including, but not limited to:<br>1. request_recv - for when a request is received at an edge node from an initiator.<br>2. response_sent - for when a response to a request is sent from an edge nodeto an initiator.<br>3. call_sent - for when an IPC call is sent from a calling node to a callee node.<br>4. call_recv - for when an IPC call from a calling node is received at a callee node.<br>5. reply_sent - for when an IPC call reply is sent from a callee | Yes | All |

According to the above example trace event schema, the trace_id and span_id properties are required in a trace event. The node_id and parent_span_id properties are optional.

The optional error_code property can be included in trace events generated when an edge node sends a response to an initiator or when a callee node sends an IPC call reply to a calling node. For example, the error_code property may be used to store in the trace event the value of an HTTP status error code associated with the request or reply such as an HTTP status error code of 400 or above.

The optional client_side_total_time property can be included in trace events generated when a calling node receives an IPC call reply from a callee node. For example, the client_side_total_time property may be used to store in the trace event a stopwatch time between when the calling node sent the IPC call to the callee node and when the calling node received the IPC call reply from the callee node.

The optional server_side_total_time property can be included in trace events generated when an edge node receives a request from an initiator or when a callee node receives an IPC call from a calling node. For example, the server_side_total_time property may be used to store in the trace event a stopwatch time between when the edge node/callee node receives the request/IPC call and when the edge node/callee node sends the response/IPC call reply.

In addition to or as an alternative to the client_side_total_time and the server_side total_time properties, trace event timestamps may be used to calculate the time spent by a calling node between sending an IPC call and receiving an IPC reply and the time spent by a callee node processing a received IPC call. In particular, a current date/time timestamp can be included in generated trace events. In this case, the time spent by a calling node between sending an IPC call and receiving an IPC reply can be computed as the difference between the timestamp in the trace event generated when the calling node receives the IPC reply and the timestamp in the trace event generated when the calling node sends the IPC call. Similarly, the time spent by a callee node between receiving an IPC call and sending an IPC reply can be computed as the difference between the timestamps in the two corresponding trace events generated by the callee node. In both cases there may be no need to account for clock drift as the difference computation may involve timestamps generated relative to the same system clock.

The above example schema lists just some of the possible properties that may be included in a trace event. Other properties in addition to or instead of those listed above are possible. For example, other required and optional properties may be included in a trace event. Further, properties in trace event may be named differently according to the requirements of the particular implementation at hand and the names of the properties listed above are merely exemplary and not limiting of the possible trace event schemas that are compatible with the disclosed technologies.

2.4 Spans

Information in generated trace events can be used to reconstruct request paths. More specifically, the values of the trace_id, parent_span_id, and span_id properties in a set of trace events can be used. The subset of a set of trace events that pertain to a particular initiator request path all have the same value for the trace_id property. Within this subset, trace events generated by the edge span in the request path can be identified by the absence of the parent_span_id property or, alternatively, the presence of the parent_span_id property having a predefined value indicating that the trace events were generated by the edge span such as, for example, zero (0) or NULL. The trace events generated by "child" spans called by the edge span, if any, can be identified in the subset as having a value for the parent_span_id property that equals the value of the span_id property identified in the trace events generated by the edge span. Steps analogous to this step may be repeated in a depth-first or breadth-first manner for each of the child, grandchildren, great-grandchildren, etc. spans of the edge span, if there are any, until all trace events in the subset have been accounted for. When complete, all spans of the request path tree and their IPC call dependencies will have been identified.

Figure 5:
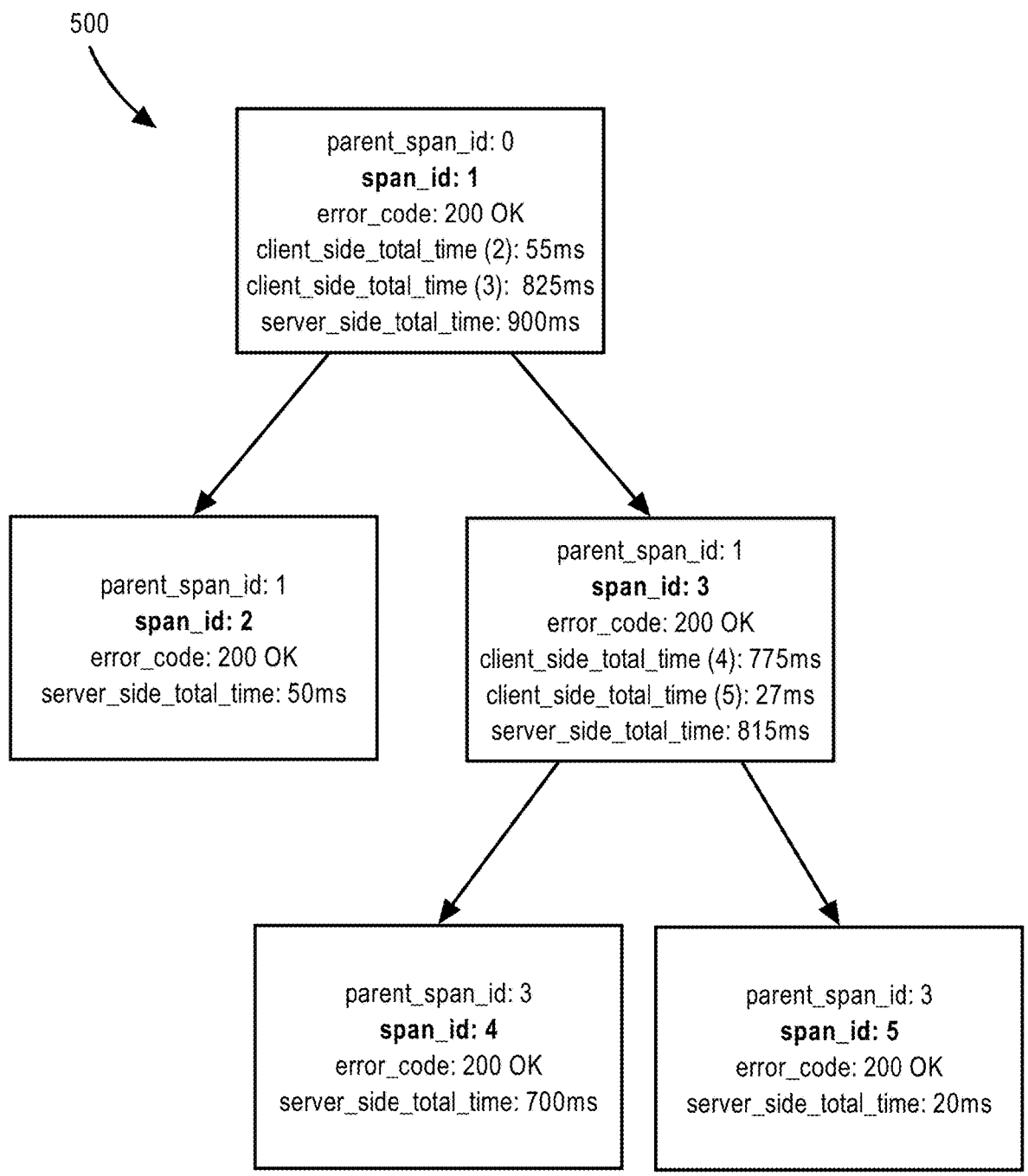
FIG. 5 illustrates an example request path tree.

For example, FIG. 5 illustrates an example request path tree 500 that can be reconstructed from trace events. This example is based on the example request path illustrated in FIG. 3 and assumes at least the following trace events are generated for the request path. The values in the trace event number column are for reference and may not actually be included in the trace events. Other values are intentionally omitted for clarity.

TABLE 2

Example Trace events

| Trace event # | trace_id | parent_span_id | span_id |
|---|---|---|---|
| 1 | 77562efa8f141c07 | 0 | 1 |
| 2 | 77562efa8f141c07 | 1 | 2 |
| 3 | 77562efa8f141c07 | 1 | 3 |
| 4 | 77562efa8f141c07 | 3 | 4 |
| 5 | 77562efa8f141c07 | 3 | 5 |

As show in FIG. 5, request path tree 500 has five (5) spans. Span 1 has two direct IPC call dependencies, one on span 2 and one on span 3. Span 3 also has two direct IPC call dependencies, one on span 4 and one on span 5. Note that the value of the trace_id property for all of the message is the same indicating that the trace events were all caused by the same initiator request and are part of the same request path.

Interesting performance metric information from the trace events can be associated with the spans when reconstructing the request path tree from the trace events. In particular, the values of the error_code, client_side_total_time, and the server_side_total_time properties in the trace events can be associated with the spans. For example, information in the following example trace events may be used to associate interesting performance metric information with the spans of the example request path tree 500. The values in the trace event number column are for reference and may not actually be included in the trace events. Further, the values in the trace event number column do not necessarily correspond to the values in the trace event number of column of Table 2 above. Other values are intentionally omitted for clarity.

TABLE 3

Example Trace Events

| Trace event # | span_id | type | error_code | client_side_total_time (milliseconds) | server_side_total_time (milliseconds) |
|---|---|---|---|---|---|
| 1 | 1 | reply_recv (from span 2) | — | 55 | — |
| 2 | 1 | reply_recv (from span 3) | — | 825 | — |
| 3 | 1 | response_sent (to initiator) | 200 OK | — | 900 |
| 4 | 2 | reply_sent (to span 1) | 200 OK | — | 50 |
| 5 | 3 | reply_sent (to span 1) | 200 OK | — | 815 |
| 6 | 3 | reply_recv (from span 4) | — | 775 | — |
| 7 | 3 | reply_recv (from span 5) | — | 27 | — |
| 8 | 4 | reply_sent (to span 3) | 200 OK | — | 700 |
| 9 | 5 | reply_sent (to span 3) | 200 OK | — | 20 |

From these trace events, it can be determined that it took approximately 900 milliseconds for span 1 to handle the initiator's request. It can also be determined that most of the time spent handling the request was by span 4 which took approximately 700 milliseconds to handle the IPC call from span 3. In this example, the error_code values returned in the IPC call replies from spans 2, 3, 4, and 5 and in the response from span 1 were all HTTP status codes of 200 OK. Alternatively, the error_code values can be from other application-level protocols (e.g., SMTP) if an application-level protocol other than HTTP is used for interprocess communication between nodes. Even if HTTP is used for interprocess communication, the error_code values could be other than 200 OK. For example, if an error occurred in span 4 handling the IPC call from node 3, the error_code value could be, for example, 500 SERVER ERROR instead of 200 OK.

3.0 Distributed Trace Aggregation

With the above distributed tracing technologies in mind, some further distributed trace aggregation technologies will now be described. As mentioned above, the distributed trace aggregation technologies make it easier for developers, engineers, and other system technicians to support and maintain an online distributed computer system.

Figure 6:
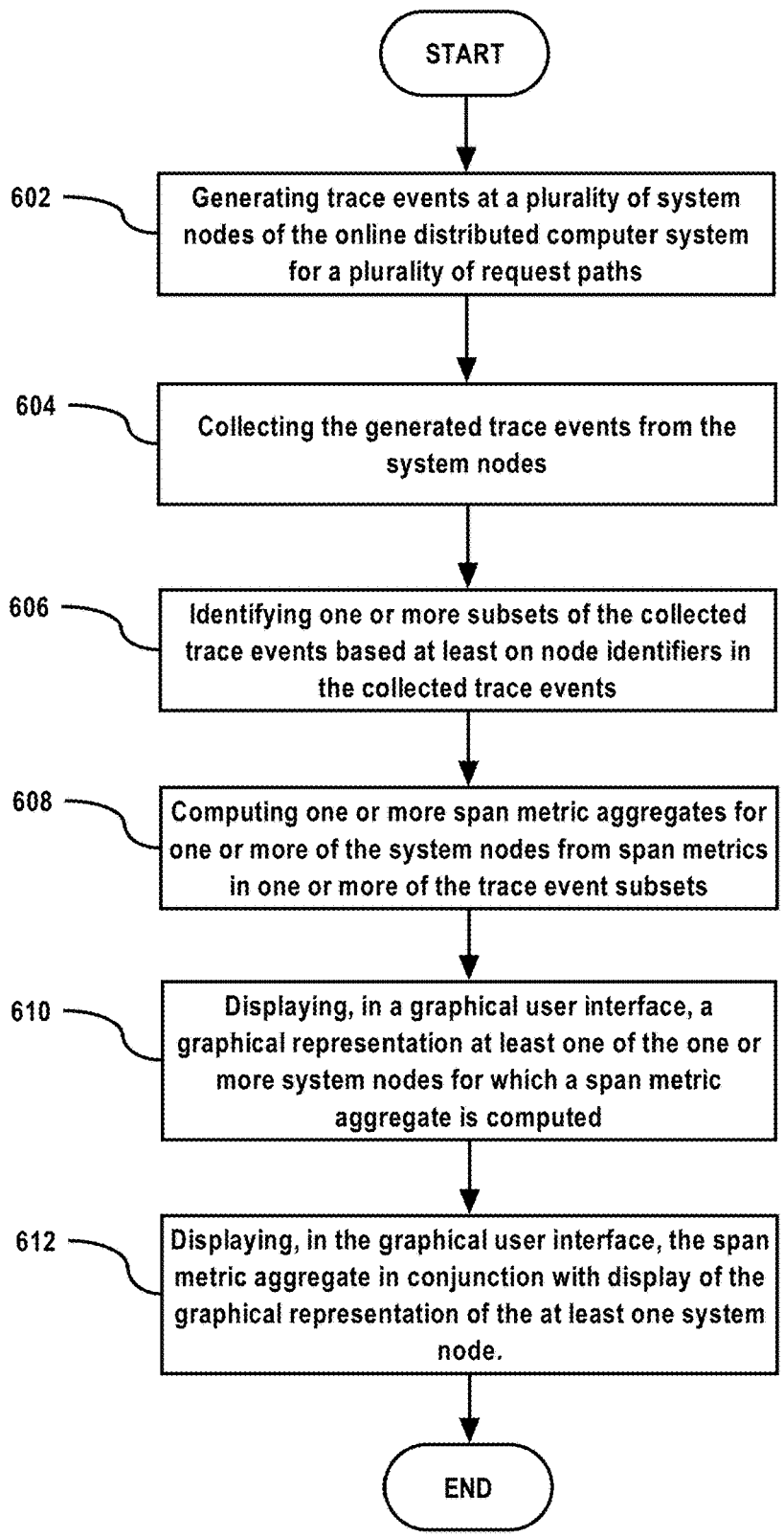
FIG. 6 is a flowchart illustrating the overall operation of distributed trace aggregation according to an embodiment of the present invention.

In an embodiment, the distributed trace aggregation technologies include a computer-implemented method performed by one or more computing devices for distributed trace aggregation. FIG. 6 is a flowchart 600 illustrating the overall operation of distributed trace aggregation in an online distributed computer system according to an embodiment of the disclosed technologies. As to the flowchart 600, each block within the flowchart represents both a method step and an apparatus element for performing the method step. Depending upon the implementation, the corresponding apparatus element may be configured in hardware, software, firmware or combinations thereof.

3.1 Generating Trace Events

At step 602, trace events are generated at a plurality of system nodes of the online distributed computer system for a plurality of request paths. Each of the request paths may correspond to an initiator request received at an edge node of the online system. Each of the request paths may traverse one or more nodes of the online system before a response is returned from the edge node to the initiator. Each trace event is generated for a corresponding one of the request paths and for a corresponding span of the corresponding request path. For example, for a given request path, a trace event may generated at any of the following times: 1) at the edge node in the request path when the initiator request is received, 2) at the edge node in the request path, when the response to the initiator request is sent to the initiator, 3) at each calling node in the request path, when the calling node sends an IPC call to a callee node, 4) at each callee node, when an IPC call is received from a calling node, 5) at each callee node, when an IPC reply is sent to a calling node, and 6) at each calling node, when an IPC reply is received from a callee node.

In some embodiments, trace events are generated at system nodes by standard libraries of executing application instances at predefined execution points. The execution points are predefined in the sense that the standard libraries used by application instances are configured or designed to generate the trace events at the execution points when the application instances are executed. For example, referring again to FIG. 4, trace events can be generated by standard library 402 at execution points 408, 410, 412, 414, 416, 418, 420, 422, 424, and 426.

Generating a trace event includes generating and/or collecting and storing trace event data in computer memory (e.g., RAM 106). The trace event data may comprise, for example, any data conforming to the trace event schema described above. Collecting trace event data may include retrieving one or more of a trace identifier, a parent span identifier, and a span identifier from thread local storage.

3.2 Collecting Trace Events

At step 604, trace events generated at system nodes are collected. In an embodiment, the trace events are collected during a sample period, which may include a continuous period of time or multiple discontinuous periods of time. For example, the sample period may correspond to a period of time such as, for instance, a twenty-four hour period of time or other suitable length of time for collecting a sufficient number of trace events for the purpose of computing span metric aggregates. In an embodiment, the sample period is user configurable, for instance, through a graphical user interface, a command line interface, a configuration file, or other computer interface. Instead of a period of time, the sample period may be defined by other criterion such as a number of trace events or based on user input. In the case of user input, the start of the sample period may correspond to first user input that indicates when to begin collecting trace events and second user input that indicates when to stop collecting trace events. For example, a user interface may be provided with VCR-like controls that allow a user to begin "recording" (collecting) trace events for a sample period, pause collection of trace events during the sample period, resume (un-pause) collection of trace events during the sample period, and stop collecting trace events for the sample period.

Collecting trace events may include persistently storing trace events in a database. FIG. 7 illustrates an example relation 702 for collecting trace events in a database. In relation 702, the rows correspond to request paths and the columns correspond to spans.

In an embodiment, a collected trace event (or information thereof) is stored in one cell of relation 702 based on the value of the trace_id property and the value of the span_id property of the trace event. Some cells of relation 702 may be empty (i.e., not store any trace event information) if no trace event with a trace_id property value and a span_id property value corresponding to the row and column of the cell, respectively, has been collected. When a trace event is collected from a system node, the value of the trace_id property in the trace event can be used to determine which row in relation 702 information in the trace event is to be stored. If the row does not yet exist, the row is added using the value of the trace_id property in the trace event as the row key. The value of the span_id property in the trace event determines which column of the row (i.e., cell) the trace event information is stored. If the column does not yet exist, the column is added using the value of the span_id property as the column key. Each cell in relation 702 may in fact have a list of values, one value for each trace event received with the same trace_id property value and the same span_id property value. Each value in the cell's list can include the parent_span_id from the trace event, the value of the error_code property, the value of the client_side_total_time property, the value of the server_side_total_time property, among other possible information in the trace event.

In an embodiment, relation 702 is managed by a database system. In an exemplary embodiment, the managing database system is an instance of the APACHE HBASE database system or an instance of the APACHE CASSANDRA database system. However, other types of database systems may be used to manage relation 702 such as, for example, a relational database management system, according to the requirements of the particular implementation at hand. Thus, the managing database system is not limited to any particular database system or particular type of database system.

Further, relation 702 is just one example relation for storing collected trace events. Other database structures may be used in other embodiments. For example, collected trace events may be stored in multiple relations instead of just a single relation.

A typical online service can be receive up to 10,000 initiator requests per second or more. Given the volume of initiator requests an online service may receive, tracing each initiator request received by the service may be impractical or undesirable due to the amount trace event information that would be generated. To limit the amount of trace event information generated, only every other N number of requests may be traced. For example, N may be 100. Thus, instead of tracing 10,000 initiator requests per second, 100 requests per second are traced instead.

The selection of which initiator requests to trace can be made at the edge nodes based on a simple running counter of number of initiator requests received. If an initiator request is selected for tracing, this fact can be communicated to other nodes in the request path so that trace events are generated only for selected requests. For example, the trace context stored in thread local storage and sent in IPC calls can have a field or value indicating whether tracing is enabled for the current request. This field or value can be checked at the various execution points in the standard libraries to determine whether or not a trace event should be generated at the execution point.

Even if only a small percentage (e.g., 1%) of all initiator requests are traced, a significant number of trace events may still need to be collected. For example, if 100 initiator requests per second are selected for tracing and there are on average 2 to 4 nodes in each request path and each node in the request path generates on average 2 to 4 trace events per initiator request, then there is on average between 400 and 1600 trace events being generated every second.

One way to efficiently collect this kind of trace event volume for computing span metric aggregates is to avoid persisting the trace event as much as possible. Typically, reading and writing data to non-volatile data storage media (e.g., hard disk) is much slower than reading and writing data to volatile data storage media (e.g., main memory). Thus, avoid writing trace event to non-volatile media can improve performance of technologies for collecting the trace events from the nodes that are used in span metric aggregate computation.

One solution to avoid persisting trace events is to use a data pipeline to move trace events generated at the nodes in the online distributed computer system to an aggregation engine that computes the span metric aggregates. This is illustrated in FIG. 8.

Figure 8:
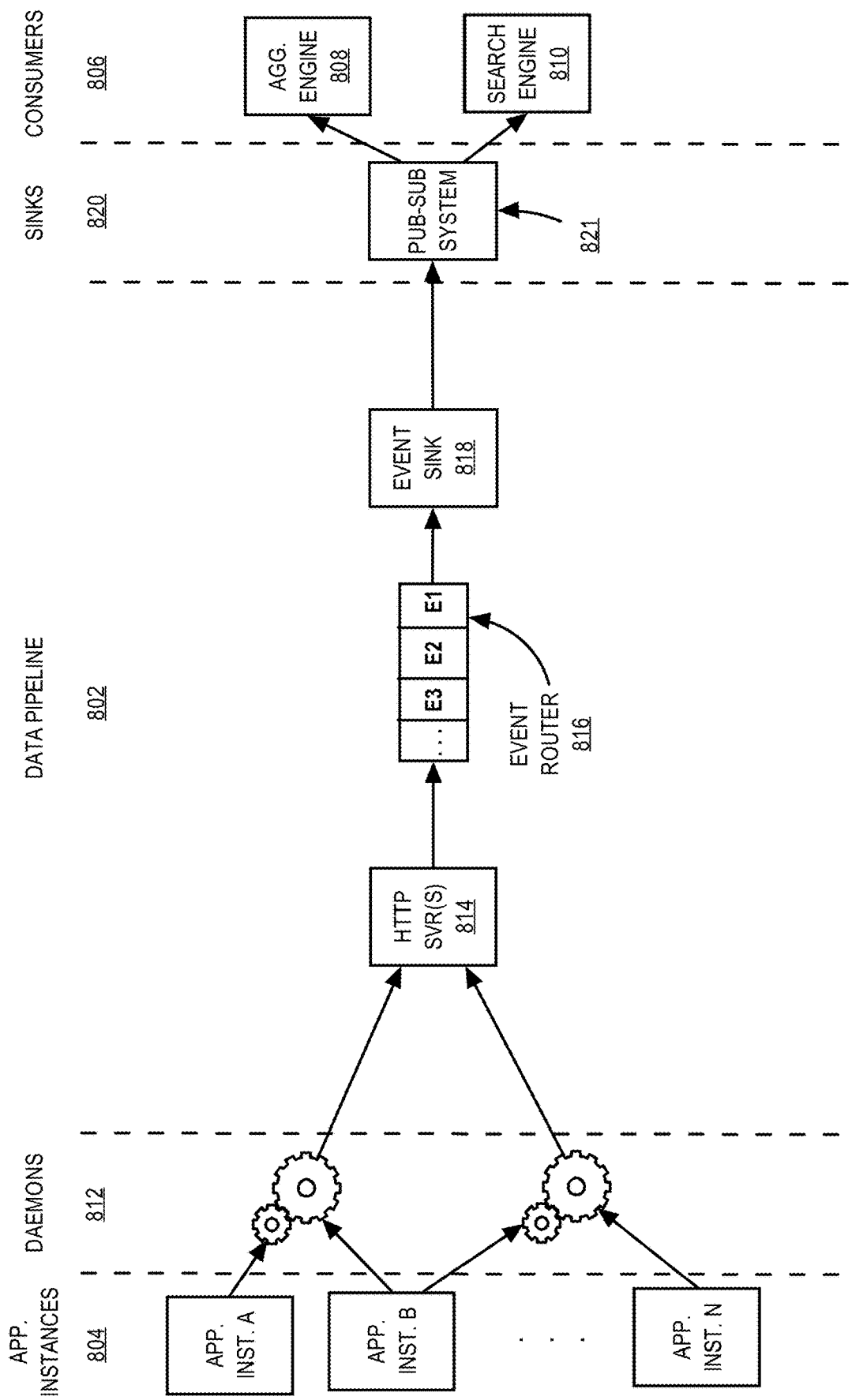
FIG. 8 is block diagram an example data pipeline computer system for collecting trace events.

In particular, FIG. 8 is a block diagram of an online distributed computer system that includes a data pipeline 802 to move trace events from application instances 804 that generate them to consumer applications 806 that use them including aggregation engine 808 and search engine 810.

Trace events generated by application instances 804 are sent by the application instances 804 to trace event daemons 812. A trace event daemon 812 may execute within the process space of an application instance 804, for example, in a thread of the process space. Alternatively, the daemon 812 may execute in a separate process space. Further, some daemons may execute within the process space of an application instance 802 and some daemons 812 may execute in separate processes spaces.

Application instances 804 do not need to persist the trace events they generate before sending them to daemons 812. Instead, application instances 804 send trace event generated in volatile memory to a daemon 812 over a communication channel. Each daemon 812 may be configured with an in-volatile memory queue for storing trace events until they can be sent to the data pipeline 802. Thus, daemons 812 also do not need to persist trace events. It should be noted that loss of some of generated trace event may be acceptable. Thus, daemons 812 may discard trace events received from application instances 804 if their in-memory queues are currently full or above a threshold.

The ratio of daemons 812 to application instances 804 can be as high as one-to-one. However, the ratio can be much less than one according to the requirements of the particular implementation at hand.

The trace event communication channels between an application instance 804 and a daemon 812 can be an interthread communication channel, if the application instance 804 and the daemon 812 execute in the same process space, or an interprocess communication channel, if the application instance 804 and the daemon 812 execute in different processes on the same instance or on different instances connected by a data network. It is expected, but not required, that the daemons 812 are connected to the data pipeline 802 by a data network such as, for example, an IP data network.

Data pipeline 802 processes trace events asynchronously in stages. Each stage comprises a queue and a pool of worker threads that consume trace events asynchronously from the queue, processes them, and sends them to the next stage. The main processing flow of trace events in the data pipeline 802 includes HTTP server(s) 814 that receives trace events sent from the daemons 812 via a remote procedure call (RPC) over HTTP mechanism.

The HTTP server(s) 814 pass received trace events onto a message router 816. The message router 816 determines which message sink 818 the trace events should be routed to. Each message sink 818 that receives trace events sends the messages to a corresponding sink system 820. One of the message sinks 818 may be for sending trace events to a publication-subscription messaging system 821. The publication-system messaging system 821 may employ a distributed commit log for persistently storing the trace events received from the corresponding message sink 818. The publication-subscription messaging system 821 may be the first place trace events are persisted. That is, trace events generated at application instances 804 may move from the application instances 804 to the daemons 812 and through the data pipeline 802 without being stored in a non-volatile data storage medium until they are received at the publish-subscription messaging system 821. In this way, large volumes of trace events can be collected from distributed application instances in a timely fashion.

Publication-subscription messaging system 821 may store a backlog of recent trace events received from the data pipeline 802. The backlog may correspond to a period of time (e.g., the past 48-hours), a certain number of trace events, or data storage units consumed by the stored trace events, and so forth. Publication-subscription messaging system 821 publishes stored trace events to consumer applications 806 including possibly a search engine 810 and an aggregation engine 808. Search engine 810 may provide a user interface for indexing, querying and viewing individual trace events. Aggregation engine 808 computes aggregates of spans identified in the trace events and provides a user interface including a call graph as described in greater detail in the next section. In an exemplary embodiment, aggregation engine 808 comprises an executing instance of the DRUID open-source software for computing span metric aggregates.

3.3 Identifying Subsets of Trace Events Pertaining to Nodes

Returning to FIG. 6, at step 606, subsets of collected trace events are identified for the purpose of computing span metric aggregates. Such identification may be based in the trace identifier, span identifier, and parent span identifier in the collected trace events.

A first type of subset that may be identified is all collected trace events that pertain to a particular request path (i.e., a particular initiator request). Collected trace events that belong to one of this type of subset all have the same value for the trace identifier property (e.g., the trace_id property described above). Thus, all collected trace events that pertain to particular request path can be identified by their common trace identified value. A set of trace events identified in a set of collected trace events that pertain to a particular request path may be referred to herein as a "request path subset". One or more request path subsets can be identified in a set of collected trace events based on the trace identifier value in the trace events in the set of collected trace events. For each such request path subset, all trace events in the request path subset may have the same value for the trace identifier property.

Within a request path subset of trace events, one or more "span" subsets can be identified based on the value of the span identifier property (e.g., the span_id property described above) in the trace events in the request path subset. In particular, all trace events in a request path subset that pertain to a particular span of that request path have the same value for the span identifier property. Thus, all trace events in a request path subset that pertain to a particular span of that request path can be identified by their common span identifier value. One or more span subsets can be identified in a request path subset of trace events based on the span identifier value in the trace events in the request path subset. For each such span subset, all trace events in the span subset may have the same value for the span identifier property.

A span identifier in a trace event uniquely identifies a span within a particular request path identified by the trace identifier of the trace event. However, the span identifier is not required to be unique across multiple request paths. Further, a span identifier for one request path and a span identifier with the same value for another request path may not necessarily correspond to the same node in the online system. Thus, a span identifier of a span in a request path is meaningful only in the context of that request path.

In an embodiment, to provide more useful span metric aggregates, the aggregates are computed for nodes, which are typically identified by well-known, human readable node identifiers. Such node identifiers can be presented in a graphical user interface in conjunction with display of span metric aggregates computed for the nodes to provide meaningful and helpful information to a user viewing the graphical user interface.

Accordingly, another type of subset that can be identified is all collected trace events that pertain to a particular node in the online distributed computer system. To identify this type of subset, span subsets are resolved to node identifiers. To resolve a span subset to a node identifier, the trace events in the span subset are examined for a value of the node identifier property (e.g., the node_id property described above). Typically, all trace events in a span subset that have a node identifier property will have the same value for the node identifier property. However, not all trace events in a span subset may have a node identifier property. For example, only one of the trace events in a span subset may have a node identifier property. This resolution may be performed for multiple span subsets across multiple request paths. As a result, the trace events in multiple span subsets across multiple request paths may be resolved to the same node identifier. Also as a result, multiple node identifiers may each be associated with a subset of collected trace events that pertain to that node. A set of trace events identified in a set of collected trace events that pertain to a particular node may be referred to herein as a "node subset". One or more node subsets can be identified in a set of collected trace events based on the trace identifier values, the span identifier values, and node identifier values in the trace events in the set of collected trace events. For each such node subset, all trace events in the node subset that have a node identifier property may have the same value for the node identifier property.

As mentioned above, a span identifier in a trace event may have meaning only in the context of a particular request path. In other words, a span identifier in a trace event may uniquely identify a span in a request path (i.e., the request path identified by the trace identifier in the trace event) that the span is a part of but not in any other request path. Similarly, a parent span identifier in a trace event may uniquely identify a span in a request path that the span is a part of but not in any other request path. Nonetheless, it can be useful to resolve parent span identifiers in trace events to node identifiers. For example, in addition to computing a span metric aggregate for a particular node subset of trace events, it may be useful to compute a span metric aggregate for just the trace events in the particular node subset associated with a particular parent node. By doing so, performance of the particular node handling all IPC calls during a sample period can be compared to the performance of the particular node handling just the IPC calls from the particular parent node during the sample period. Such comparison may be helpful in identifying if IPC calls from the particular parent node are a significant cause of poor performance of the particular node.

In an embodiment, to resolve parent span identifiers to node identifiers, all unique span identifiers in all span subsets in a given request path subset are resolved to node identifiers. Then, the parent span identifiers in the span subsets in the given request path are resolved to node identifiers based on the span identifier resolutions. For example, if span identifier '4' in a request path identified by trace identifier 'abc656b2a23d42be' is resolved to node identifier 'web_server_1', then a parent span identifier of '4' in a trace event with the same trace identifier of 'abc656b2a23d42be' can also be resolved to 'web_server_1'.

By resolving parent span identifiers in trace events belonging to a node subset to node identifiers, trace events in the node subset can be sub-divided by parent node identifier. A set of trace events identified in a set of collected trace events that pertain to a particular node and a particular parent node may be referred to herein as a "parent-node subset". One or more parent-node subsets can be identified in a set of collected trace events based on the trace identifier values, the span identifier values, the parent span identifier values, and node identifier values in the trace events in the set of collected trace events. For each such parent-node subset, all trace events in the parent-node subset that have a node identifier property may have the same value for the node identifier property. Further, the parent-node subset is associated with a "parent" node identifier which identifies the parent node of all trace events in the parent-node subset.

Within a span subset of trace events, one or more "parent-span" subsets can be identified based on the value of the parent span identifier property (e.g., the parent_span_id property described above) in the trace events in the span subset. In particular, all trace events in a span subset that pertain to a particular parent span have the same value for the parent span identifier property. Thus, all trace events in a span subset that pertain to a particular parent span can be identified by their common parent span identifier value. One or more parent-span subsets can be identified in a span subset of trace events based on the parent span identifier value in the trace events in the span subset. For each such parent-span subset, all trace events in the parent-span subset have the same values for the trace identifier, the span identifier, and the parent span identifier properties.

3.4 Computing Span Metric Aggregates

At step 608, according to an embodiment, one or more span metric aggregates are computed for each node subset identified in a set of trace events collected during a sample period.

A number of different span metric aggregates can be computed from a node subset.

In an embodiment, a span metric aggregate is computed for a node subset as the count of the number of requests/calls received by the node during the sample period. The number of requests/calls received by the node may be counted as the number of trace events in the node subset of type "request_recv" or of type "call_recv".

In an embodiment, a span metric aggregate is computed for a node subset as the count of the number of responses/replies sent by the node during the sample period. The number of requests/calls received by the node may be counted as the number of trace events in the node subset of type "request_recv" or of type "call_recv".

In an embodiment, a span metric aggregate is computed for a node subset as the count of the number of responses/replies sent by the node during the sample period. The number of requests/calls received by the node may be counted as the number of trace events in the node subset of type "request_recv" or of type "call_recv".

In an embodiment, one or more span metric aggregates are computed for a node from the values of the "error_code" property in the node subset identified for the node. In an embodiment, one or more span metric aggregates are computed for a node from the values of the "server_side_total_time" property in the node subset identified for the node. In both cases, the span metric aggregates may be computed from trace events in the node subset of certain trace event types. For example, the span metrics aggregates may be computed trace events in the node subset of type "request_sent" or type "reply_sent".

In an embodiment, a span metric aggregate is computed for a node subset as the count of the number of errors in the node subset. An error may be counted if a trace event in the node subset of type "request_sent" or type "reply_sent" has a value for the "error_code" property that indicates that an error occurred. For example, for the HTTP protocol, a value of "500" for the "error_code" property may indicate that an error occurred. An error may also be counted if a given trace event in the node set of type "request_recv" or of type "call_recv" has no corresponding trace event in the node subset of type "response_sent" or "reply_sent". This indicates that an initiator request or an IPC call was received by the node but that the node was unable to send to a response or reply. The corresponding trace event, if present in the node subset, would have the same value for the trace identifier property as the given trace event. Thus, the absence of a corresponding trace event in the node subset with a value for the trace identifier property equal to the value for the trace identifier property in the given trace event may indicate than an error occurred.

In an embodiment, a span metric aggregate is computed for a node subset as the rate of errors in the node subset. The rate may be computed over the number of spans in the node subset (e.g., number of errors per number of spans in the node subset) or over a period of time (i.e., number of errors per period of time). The number of spans may be counted as the number of trace events in the node subset of type "request_sent" or type "reply_sent". This count is also a count of the number of spans in the node subset for which a response or a reply is sent by the node. Alternatively, the number of spans may be counted as the number of trace events in the node subset of type "request_recv" or type "call_recv". This count is also a count of the number of spans in the node subset for which a request or a call is received by the node.

In an embodiment, a span metric aggregate is computed for a node subset as the count of the number of errors in the node subset. An error may be counted if a trace event in the node subset of type "request_sent" or type "reply_sent" has a value for the "error_code" property that indicates that an error occurred. For example, for the HTTP protocol, a value of "500" for the "error_code" property may indicate that an error occurred.

In an embodiment, a span metric aggregate is computed for a node subset as the average span time. The average span time may be computed as an average of the values of the "server_side_total_time" property in trace events in the node subset of type "request_sent" or type "reply_sent". In some embodiments, only trace events of type "request_sent" or type "reply_sent" with a value for the "error_code" property indicating that the request or reply was successfully sent are considered in the average computation. The computed average can be an arithmetic mean of the "server_side_total_time" values, a median of the values, a truncated mean of the values, a weighted mean of the values, a moving average, or other mathematical average of the values.

Any of the above span metric aggregates computed for a node subset can be similarly computed for a parent-node subset by considering only the trace events the parent-node subset.

3.5 Displaying Span Metric Aggregates

Once one or more span metric aggregates have been computed based on trace events collected from nodes in an online distributed computer system during a sample period, they may be presented to a user in a graphical user interface. At steps 610 and 620, a graphical representation of at least one of the one or more system nodes for which a span metric aggregate is computed is displayed in a graphical user interface in conjunction with display of the span metric aggregate. In an embodiment, the graphical user interface comprises a call graph that visually conveys the IPC call dependencies between systems nodes during the sample period.

Figure 9:
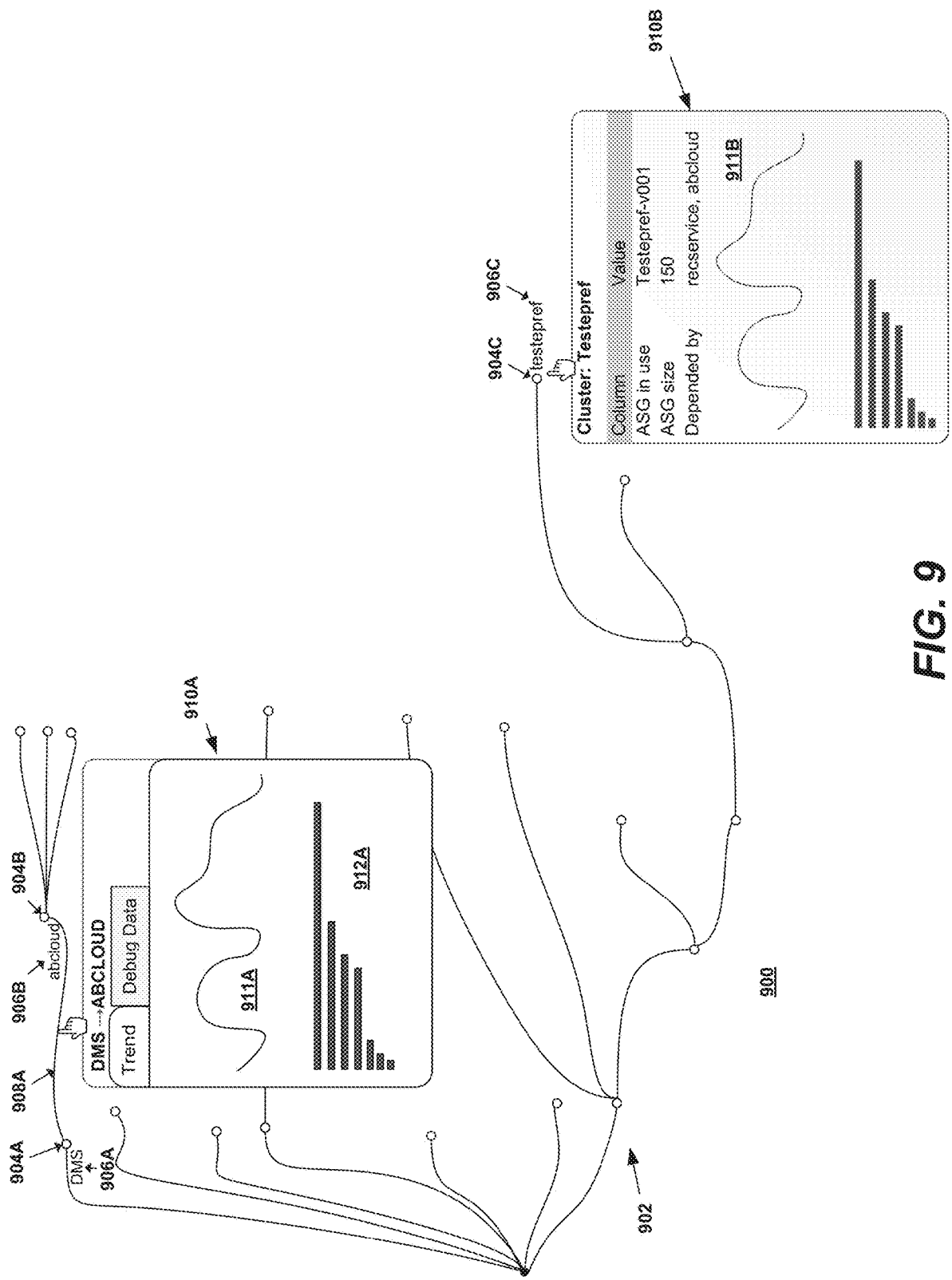
FIG. 9 is an example call graph that may presented to a user in a computer graphical user interface according to an embodiment of the present invention.

FIG. 9 illustrates an example call graph 902 that may be generated and presented in a graphical user interface 900 to a user after one or more span metric aggregates have been computed. Instructions and data for generating graphical user interface 900 at a user's computing device may be generated by a web server and served to the user's computing device for processing by a web browser application executing on the user's computing device. For example, the instructions may include HyperText Markup Language (HTML) data, eXtensible Markup Language (XML) data, digital image data, or other data or instructions suitable for rendering graphical user interface 900 at the user's computing device.

As shown, the call graph 902 comprises a number of visual nodes represented as circles in the call graph 902. Each visual node corresponds to a node in the online system. A visual edge connecting two visual nodes represent one or more IPC calls during the sample period between the two nodes corresponding to the two visual nodes connected by the visual edge. Each visual node in the call graph 902 also corresponds to a node subset. Each visual edge in the call graph also correspond to a parent-node subset.

In an embodiment, visual nodes in the call graph 902 are labeled with their respective node identifiers. For example, visual node 904A is labeled with the node identifier label 906A of "DMS", visual node 904B is labeled with the node identifier label 906B of "ABCLOUD", and visual node 904C is labeled with the node identifier label 906C of "TESTEPREF".

In some embodiments, visual nodes are color coded to indicate performance problems. For example, a visual node may be colored red if the number of errors for the corresponding node during the sample period or the error rate for the corresponding node during the sample period exceeds a threshold. As another example, a visual node may be colored according to an average span time for the corresponding node during the sample period. For example, a visual node may be colored green to indicate that the average span time for the corresponding node during the sample period was below a first level threshold, colored yellow if the average span time was above the first level threshold but below a second level threshold, or colored red if the average span time was above the second level threshold.

A visual edge connecting two visual nodes in the call graph 902 represents an IPC call dependency during the sample period between the nodes corresponding to the two visual nodes connected by the visual edge. For example, visual edge 908A connecting visual nodes 904A and 904B in call graph 902 represents one or more IPC calls from the DMS node to the ABCLOUD node during the sample period.

In some embodiments, visual edges are color coded to indicate performance problems. For example, a visual edge may be colored red if the number of errors for the corresponding node during the sample period or the error rate for the corresponding parent-node subset during the sample period exceeds a threshold. As another example, a visual edge may be colored according to an average span time for the corresponding parent-node subset during the sample period. For example, a visual edge may be colored green to indicate that the average span time for the corresponding parent-span subset during the sample period was below a first level threshold, colored yellow if the average span time was above the first level threshold but below a second level threshold, or colored red if the average span time was above the second level threshold.

In some embodiments, the call graph 902 is interactive. In particular, a user may direct input to the graphical user interface to display computed span metric aggregates. In this way, the user can obtain detailed performance information about selected nodes of interest.

In one embodiment, when a user directs user input to a visual edge of the call graph 902, one or more span metric aggregates computed for the corresponding parent-node subset are displayed. For example, graphical user interface dialog 910A may be displayed in response to user input (e.g., touch gesture, mouse over, click, etc.) directed to visual edge 908A. The dialog 910A includes a trend chart 911A and a bar chart 912A. Trend chart 911A graphs a trend in the number of IPC calls from node "DMS" to node "ABCLOUD" over the sample period. Bar chart 912A charts the number of IPC replies from node "ABCLOUD" to node "DMS" over the sample period by status code (e.g., HTTP status code).

In one embodiment, when a user directs user input to a visual node of the call graph 902, one or more span metric aggregates computed for the corresponding node subset are displayed. For example, graphical user interface dialog 910B may be displayed in response to user input (e.g., touch gesture, mouse over, click, etc.) directed to visual edge 906C. The dialog 910B includes a trend chart 911B. Trend chart 911B graphs a trend in the number of IPC calls from all parent nodes to node "TESTEPREF" during the sample period.

4.0 Targeted Tracing

As discussed above, initiator requests can be traced on a uniformly random basis. For example, every other N initiator requests can be selected for tracing. While uniformly random tracing can be useful for purposes of distributed trace aggregation, there may be some circumstances where targeted tracing is desired. For example, a user may report an error when making a certain request of an online service. In this case, the online service provider may wish to trace a selected subset of all subsequent user requests of the online service in order to diagnose the root cause of the error. For example, the online service provider may wish to trace all subsequent user requests from the user that reported the error. Such targeted tracing is not possible with a distributed tracing technology that traces initiator requests only in a uniformly random way.

With targeted distributed tracing, trace events for specifically targeted initiator requests are generated. In an embodiment, the targeted initiator request are HTTP requests and the HTTP requests can be targeted based on fields in the HTTP request header and name-value pairs in the query string portion of the HTTP request Uniform Resource Locator (URL). To do so, edge nodes of the online distributed computer system are configured with one or more targeted trace queries. When a HTTP request from an initiator arrives, the edge node evaluates the HTTP request against the one or more queries. If any one of the queries is satisfied by the HTTP request, then distributed tracing is enabled for the request. The edge node can enable distributed tracing for the request by setting an appropriate field or value in the trace context for the request that is propagated within nodes of the online distributed computer system in thread-local storage and between nodes of the online distributed computer system in interprocess communication calls.

So that trace event generated for a targeted initiator HTTP request can be associated with the query that caused the request to be targeted, the edge node that enables tracing for the request generates a special "targeted" trace event that includes the probabilistically unique trace identifier assigned to the request and the target trace query (or an identifier thereof) the request satisfied. By doing so, when all trace events generated with that trace identifier including the targeted trace event are collected, it can be determined by the presence of the targeted trace event in the collection: a) that the initiator HTTP request assigned that trace identifier was a targeted request, and b) the target trace query the targeted request satisfied.

Figure 10:
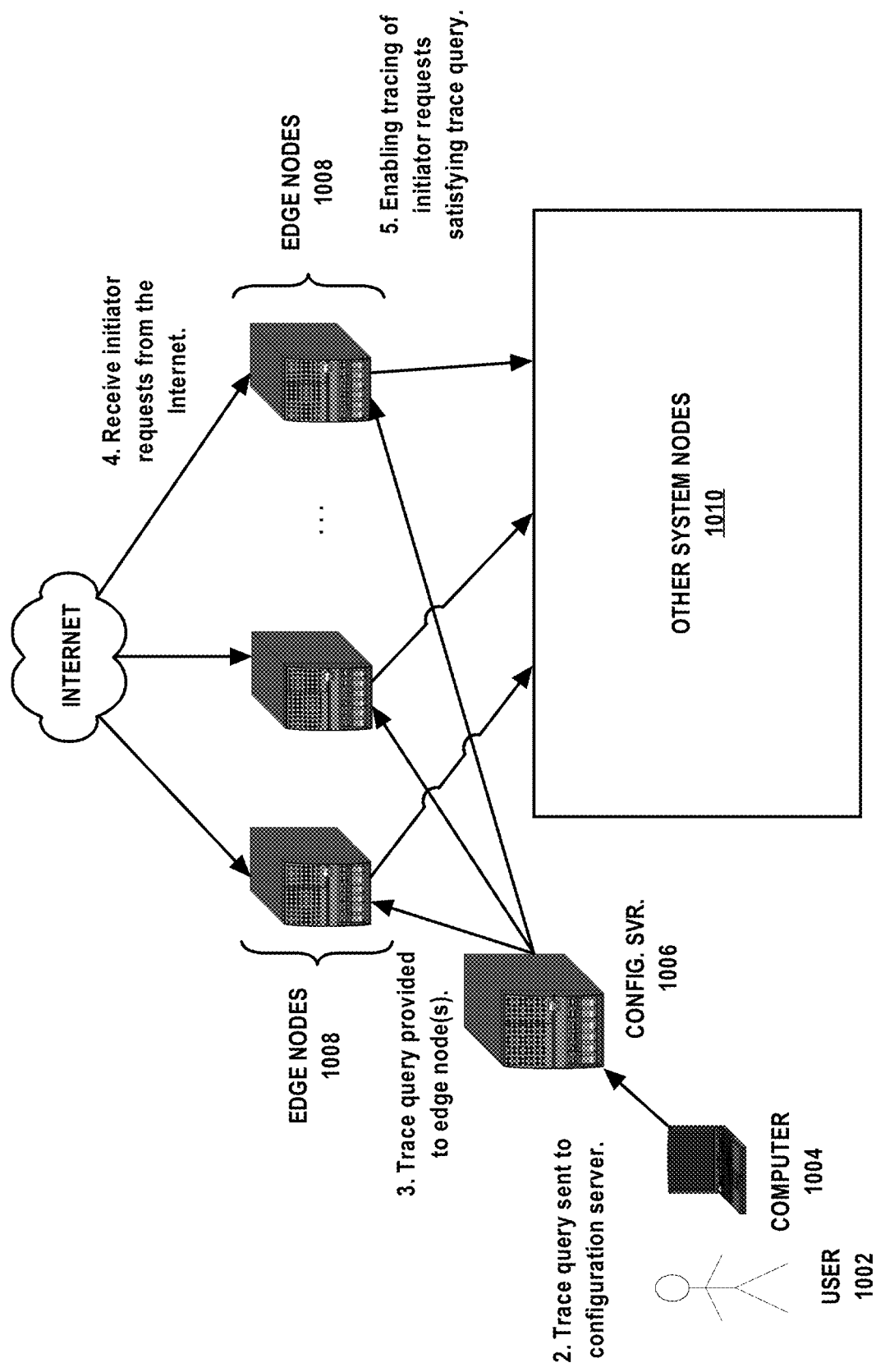
FIG. 10 is a flow diagram illustrating an example of targeted distributed tracing.

FIG. 10 is a flow diagram of distributed tracing technology for targeted distributed tracing. Initially, a user 1002 provides a trace query to targeted tracing configuration server 1006 through the user's computer 1004. The user 1002 can provide the trace query through a user interface presented at the user's computer 1004 such as, for example, a command line interface or a graphical user interface (e.g., a web page sent from configuration server 1006).

In general, the trace query is a set of name-expression pairs. Each name and expression can be formatted as a character string data type. Each name of a name-expression pair may correspond to a HTTP request field name and the expression of the name-expression pair corresponds to the value of that HTTP request field name. The expression can be a literal character string value or a regular expression for pattern matching against the value of the corresponding HTTP request field name. The HTTP request field can be a field (i.e., name-value pair) in the query string portion of the HTTP request URL or a header field in the HTTP request header portion of the HTTP request. Thus, for purposes of evaluating a trace query against an incoming HTTP request, there may be no distinction made between HTTP request fields from the query string portion of the HTTP request URL and fields from the HTTP request header.

In some instances, a trace query is a set of name-expression pairs arranged in a Boolean expression in which name-expression pairs are related to one another by one or more Boolean operators such as AND, OR, NOT and precedence operators [e.g., open/closed parentheses ( )] to form an overall Boolean expression that as a whole either evaluates to TRUE or FALSE when applies to a given HTTP request.

Once the user 1002 has provided the trace query through the user interface at the user's computer 1004, it is sent to the configuration server 1006 which sends the trace query some or all of the edge nodes 1008 in the online distributed computer system. Each edge node 1008 may maintain a list of one or more different trace queries where each of the different trace queries target different initiator HTTP requests.

When an edge node 1008 configured with a trace query 1008 receives a HTTP request from an initiator, the edge node 1008 evaluates each of the trace queries in its list against the incoming HTTP request. This evaluation may be performed as part of HTTP request handling. In particular, the evaluation may be performed after the HTTP request URL and request headers have been parsed and stored in an appropriate data structure such as an associative array, dictionary, or other mapping between HTTP request field names and their values.

For evaluation purposes, for a given name-expression pair in a trace query, then the name-expression pair is satisfied by the incoming HTTP request if the HTTP request has an HTTP field with the specified name and its value matches the specified expression. For purposes of matching the HTTP request field value to the specified expression, such matching may be case insensitive. If the specified expression is a regular expression, then the regular expression is evaluated against the HTTP request field value to determine if there is a match. Otherwise, the HTTP request field value matches the specified expression if there is an exact case-insensitive match.

For a trace query with multiple name-expression pairs, the trace query is satisfied if a Boolean expression relating the multiple name-expression pairs together evaluates to TRUE. This involves evaluating at least one name-expression pairs depending on the particular Boolean expression at hand. If the trace query is simply a set of two or more name-expression pairs, then the multiple name-expression pairs can be related together in the disjunctive or the conjunctive, according to a default.

If the edge node 1008 that receives an incoming initiator HTTP request determines that the HTTP request satisfies a trace query, then the edge node 1008 enables tracing for that HTTP request. Such enabling involves setting a particular field value in the trace context for the HTTP request so that the other system nodes 1010 of the online distributed computer system generate trace events when handling interprocess communication calls in the request path of the HTTP request. As mentioned above, the trace context can be generated by the edge node and stored in thread-local storage for propagation to other instrumentation points at the edge node. Further, the trace context can be propagated to other nodes 1010 in interprocess communication calls. For example, the trace context stored in thread local storage and sent in interprocess communications calls can have a field or value indicating whether tracing is enabled for the current HTTP request. This field or value can be checked at the various execution points in the standard libraries to determine whether or not a trace event should be generated at the instrumentation point.

In addition to setting the appropriate field value in the trace context when a targeted HTTP request is identified, the edge node generates a special trace event. The special trace event allows processes and applications (e.g., search engine applications) that consume trace events from the data pipeline to determine whether a given distributed trace was targeted (or just uniformly randomly selected) and, if targeted, the trace query that targeted it. To do this, the specially generated trace event includes the trace identifier assigned to the HTTP request by the edge node and some indication that the HTTP request was targeted. This indication could be the trace query itself and/or the HTTP request fields that satisfied the trace query. The indication could also include a special trace event type value indicating that the trace is for a targeted initiator request.

Another benefit of generating this special trace event is that trace query and/or HTTP request field information does not need to be propagated in the trace context or stored in other trace events generated for the targeted HTTP request. Instead, processes and applications that consume trace events can determine whether a set of trace events all with the same trace identifier value were generated for a targeted trace or not by examining the set for the presence or absence of the special trace event. If special trace event is present in the set, then the trace was a targeted trace and information about the trace query and/or matching HTTP request fields can be obtained from the special trace event. If the special trace event is not present in the set, then the trace is not a targeted trace (assuming a special trace event was never generated).

5.0 Extensions and Alternatives

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method for initiating a targeted distributed trace in an online distributed computer system, the method comprising:
    receiving, by an edge node of the online distributed computer system, a first trace query associated with a first targeted distributed trace, wherein the first targeted distributed trace includes tracing one or more interprocess communications (IPC) calls made, based on a received request, between nodes included in the online distributed computer system;
    receiving, by the edge node, a first initiator request;
    evaluating one or more fields included in the first initiator request against the first trace query;
    determining that the first initiator request satisfies the first trace query when the one or more fields included in the first initiator request match at least a first portion of the first trace query;
    generating first targeted trace data that is associated with the first targeted distributed trace of the one or more IPC calls, comprising:
        generating a special trace event type value specifying that the first initiator request satisfies the first trace query, and
        including, in the first targeted trace data, (i) the special trace event type value, and (ii) a trace identifier assigned to the first initiator request, wherein the first targeted trace data indicates that the first targeted distributed trace is associated with the first trace query; and
    enabling the first targeted distributed trace of the one or more IPC calls within the online distributed computer system via the first targeted trace data by storing in thread local storage:
        a field value indicating that tracing of the first initiator request is enabled, and
        the trace identifier in association with the field value.

2. The method of claim 1, wherein the first initiator request comprises a HyperText Transfer Protocol (HTTP) request.

3. The method of claim 1, wherein generating the first targeted trace data comprises including the first trace query in the first targeted trace data.

4. The method of claim 1, wherein enabling the first targeted distributed trace further comprises sending a first IPC call from the edge node to another node, wherein the first IPC call includes the field value and the trace identifier.

5. The method of claim 1, wherein generating the first targeted trace data further comprises including, in the first targeted trace data, one or more fields of the first initiator request that satisfied the first trace query.

6. The method of claim 1, wherein generating the first targeted trace data further comprises including, in the first targeted trace data, the first trace query.

7. The method of claim 1, wherein the edge node receives the first trace query from a configuration server.

8. The method of claim 1, wherein a value of the trace identifier is distinct from a value of the first trace query.

9. The method of claim 1, wherein enabling the first targeted distributed trace further comprises generating a span identifier assigned to the first initiator request.

10. The method of claim 1, further comprising:
    receiving, by the edge node, a second trace query associated with tracing one or more IPC calls made, based on the received request, between the nodes included in the online distributed computer system, wherein:
        the second trace query includes targeting criteria specifying one or more name-expression pairs included in the received request, and
        a first name-expression pair is included in the second trace query and is not included in the first trace query;
    evaluating one or more fields included in the first initiator request against the second trace query to determine whether the first initiator request includes at least one name-expression pair included in the targeting criteria; and
    determining that the first initiator request does not satisfy the second trace query when the fields included in the first initiator request do not match at least one name-expression pair included in the first trace query.

11. One or more non-transitory computer-readable media storing program instructions that, when executed by one or more processors, cause the one or more processors to perform the steps of:
    receiving, by an edge node of an online distributed computer system, a first trace query associated with a first targeted distributed trace, wherein the first targeted distributed trace includes tracing one or more interprocess communications (IPC) calls made, based on a received request, between nodes included in the online distributed computer system;
    receiving, by the edge node, a first initiator request;
    evaluating one or more fields included in the first initiator request against the first trace query;
    determining that the first initiator request satisfies the first trace query when the one or more fields included in the first initiator request match at least a first portion of the first trace query;
    generating first targeted trace data that is associated with the first targeted distributed trace of the one or more IPC calls, comprising:
        generating a special trace event type value specifying that the first initiator request satisfies the first trace query, and
        including, in the first targeted trace data, (i) the special trace event type value, and (ii) a trace identifier assigned to the first initiator request, wherein the first targeted trace data indicates that the first targeted distributed trace is associated with the first trace query; and
    enabling the first targeted distributed trace of the one or more IPC calls within the online distributed computer system via the first targeted trace data by storing in thread local storage:
        a field value indicating that tracing of the first initiator request is enabled, and
        the trace identifier in association with the field value.

12. An edge node computing device in an online distributed computer system, the edge node comprising:
    a memory; and
    a processor coupled to the memory that:
        receives a first trace query associated with a first targeted distributed trace, wherein the first targeted distributed trace includes tracing one or more interprocess communications (IPC) calls made, based on a received request, between nodes included in the online distributed computer system;
        receives a first initiator request;
        evaluates one or more fields included in the first initiator request against the first trace query;
        determines that the first initiator request satisfies the first trace query when the one or more fields included in the first initiator request match at least a first portion of the first trace query;

generates first targeted trace data that is associated with the first targeted distributed trace of the one or more IPC calls, comprising:

generating a special trace event type value specifying that the first initiator request satisfies the first trace query, and including, in the first targeted trace data, (i) the special trace event type value, and (ii) a trace identifier assigned to the first initiator request, wherein the first targeted trace data indicates that the first targeted distributed trace is associated with the first trace query; and enables the first targeted distributed trace of the one or more IPC calls within the online distributed computer system via the first targeted trace data by storing in thread local storage:

a field value indicating that tracing of the first initiator request is enabled, and the trace identifier in association with the field value.

13. The edge node computing device of claim 12, wherein the edge node sends the trace identifier in a first IPC call to another node when the first initiator request satisfies the first trace query.

* * * * *